(12) United States Patent
Mitsui et al.

(10) Patent No.: US 6,351,298 B1
(45) Date of Patent: *Feb. 26, 2002

(54) REFLECTIVE TYPE LIQUID CRYSTAL DISPLAY DEVICE

(75) Inventors: Seiichi Mitsui; Masayuki Okamoto, both of Kashiwa; Shun Ueki, Matsudo, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/658,552

(22) Filed: Sep. 8, 2000

Related U.S. Application Data

(63) Continuation of application No. 09/021,155, filed on Feb. 10, 1998, now Pat. No. 6,175,399.

(30) Foreign Application Priority Data

Feb. 10, 1997 (JP) ................................................ 9-26290
Feb. 26, 1997 (JP) ................................................ 9-41794

(51) Int. Cl.$^7$ ...................... G02F 1/1335; G02F 1/1333
(52) U.S. Cl. ............................. 349/113; 349/86; 349/88; 349/112; 349/117
(58) Field of Search ................................ 349/113, 117, 349/86, 88, 112

(56) References Cited

U.S. PATENT DOCUMENTS

| | | | |
|---|---|---|---|
| 4,660,936 A | * 4/1987 | Nosker | 350/339 |
| 4,688,900 A | * 8/1987 | Doane et al. | 350/347 |
| 4,994,204 A | 2/1991 | Doane et al. | 252/299.01 |
| 5,354,498 A | * 10/1994 | Akashi et al. | 252/299.01 |
| 5,530,567 A | * 6/1996 | Takei | 359/51 |
| 5,548,425 A | 8/1996 | Adachi et al. | 359/69 |

(List continued on next page.)

FOREIGN PATENT DOCUMENTS

| | | |
|---|---|---|
| JP | 52-129450 | 10/1977 |
| JP | 54-26756 | 2/1979 |
| JP | 55-48733 | 4/1980 |
| JP | 55-70817 | 5/1980 |
| JP | 63-501512 | 6/1988 |
| JP | 1-198725 | 8/1989 |

(List continued on next page.)

OTHER PUBLICATIONS

Liquid Crystal Device Handbook Edited by the 142nd Committee of Japan Society of the Promotion of Science and Published by the Nikkan Kogyo Shimbun Ltd. on Sep. 29, 1989, pp. 323–324, with partial translation.

*Primary Examiner*—William L. Sikes
*Assistant Examiner*—Tarifur R. Chowdhury
(74) *Attorney, Agent, or Firm*—George W. Neuner, Esq.; Dike, Bronstein, Roberts & Cushman, IP Group of Edwards & Angell, LLP

(57) ABSTRACT

A reflective type liquid crystal display device in accordance with the present invention includes a reflector film having excellent polarization preservation properties and an anisotropic diffusing film for diffusing only the light polarized in a particular direction. The anisotropic diffusing film is composed of a complex of liquid crystal and a polymer and selectively diffuses incident light. If a liquid crystal layer composed of dichroic dye and liquid crystal is employed, it becomes possible to carry out high contrast display with the anisotropic diffusing film and the reflector film and to prevent reflections of nearby objects appearing on the screen. Similarly, if a liquid crystal layer composed of liquid crystal and a polymer and having a twist angle of orientation of the liquid crystal specified to be in a range of 40° to 50° between an insulating substrate and a reflector member is employed, and the reflector film possesses excellent polarization preservation properties, similarly to the above case a reflective type liquid crystal display device can be obtained which reflects no nearby objects on the screen and can carry out high contrast display.

17 Claims, 26 Drawing Sheets

U.S. PATENT DOCUMENTS

| | | | |
|---|---|---|---|
| 5,668,651 A | | 9/1997 | Yamada et al. .............. 349/156 |
| 5,680,185 A | * | 10/1997 | Kobayashi et al. ............ 349/88 |
| 5,731,858 A | * | 3/1998 | Hisatake et al. ............. 349/112 |
| 5,769,393 A | * | 6/1998 | Kobayashi et al. ..... 252/299.01 |
| 5,796,455 A | * | 8/1998 | Mizobata et al. ............ 349/116 |
| 5,828,471 A | * | 10/1998 | Davis et al. ................... 359/15 |
| 5,831,698 A | | 11/1998 | Depp et al. .................... 349/64 |
| 5,877,829 A | * | 3/1999 | Okamoto et al. .............. 349/74 |
| 5,889,570 A | * | 3/1999 | Mitsui et al. ................ 349/113 |
| 5,929,956 A | * | 7/1999 | Neijzen et al. .............. 349/113 |
| 5,953,089 A | * | 9/1999 | Hiji et al. .................... 349/112 |

FOREIGN PATENT DOCUMENTS

| | | |
|---|---|---|
| JP | 6-27481 | 2/1994 |
| JP | 407028054 A | 1/1995 |
| JP | 7-218906 | 8/1995 |
| JP | 8-106087 | 4/1996 |

* cited by examiner

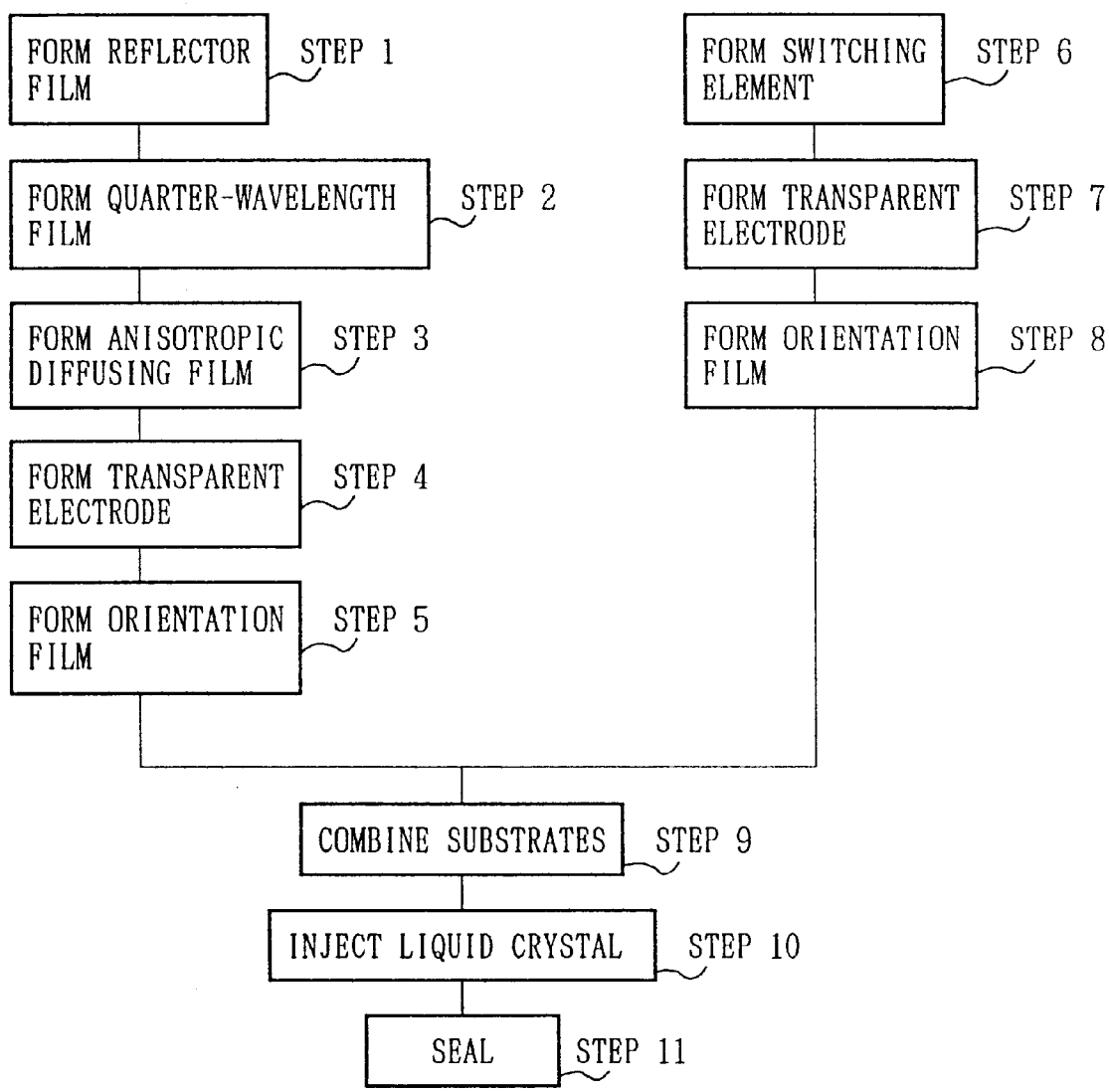

DIFFUSION CHARACTERISTICS EVALUATION OPTICAL SYSTEM

POLARIZATION PRESERVATION PROPERTIES EVALUATION OPTICAL SYSTEM

NO VOLTAGE APPLIED

VOLTAGE APPLIED

NO VOLTAGE APPLIED

VOLTAGE APPLIED

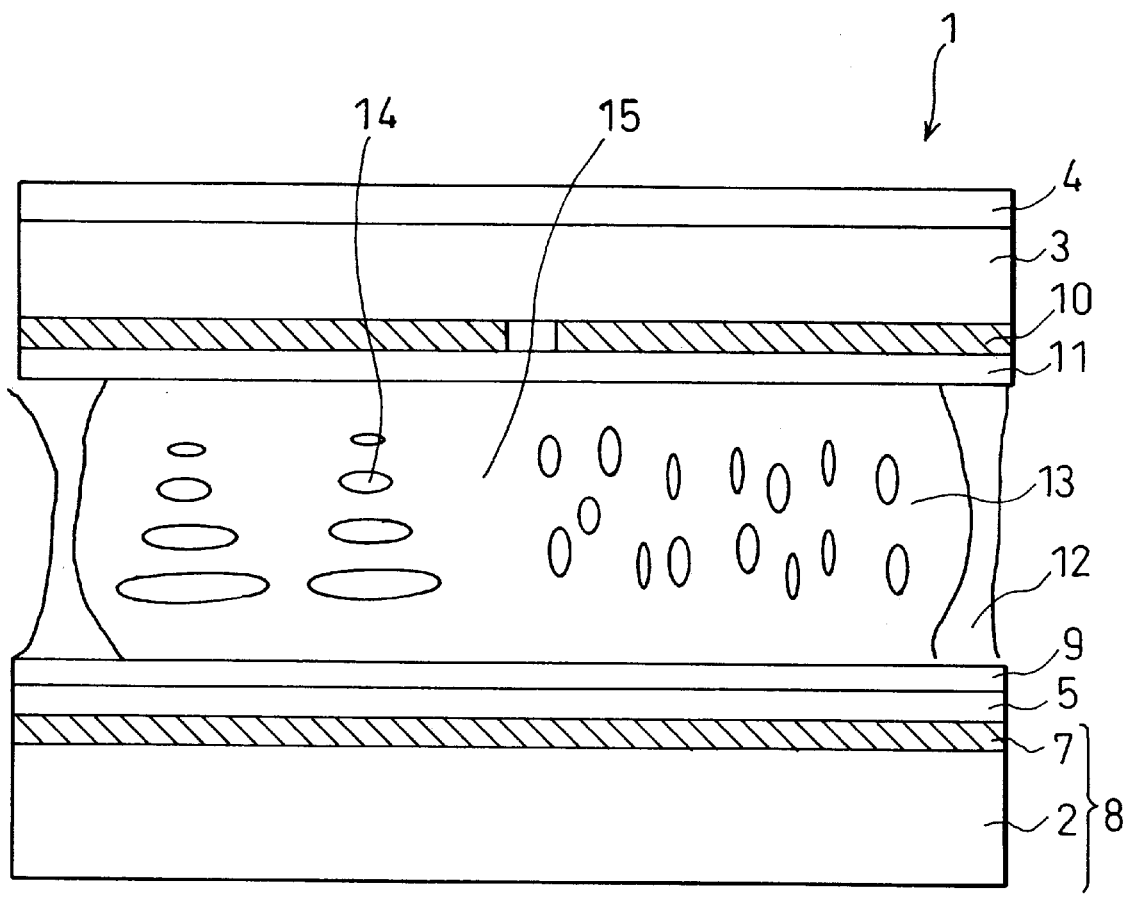

DIFFUSION CHARACTERISTICS
EVALUATION OPTICAL SYSTEM

POLARIZATION PRESERVATION
PROPERTIES EVALUATION
OPTICAL SYSTEM

REFLECTIVE TYPE LIQUID CRYSTAL DISPLAY DEVICE

This application is a continuation of Ser. No. 09/021,155 filed Feb. 10, 1998, now U.S. Pat. No. 6,175,399 B1.

FIELD OF THE INVENTION

The present invention relates to reflective type liquid crystal display devices, and more particularly to reflective type liquid crystal display devices suitable adopted for various kinds of audio-visual appliances, information display devices, and game machines, such as word processors, notebook type personal computers, electronic still cameras, portable video cameras, portable information terminus, vehicle information display devices.

BACKGROUND OF THE INVENTION

FIG. 25 is a cross-sectional view showing an arrangement of a reflective type liquid crystal display device 101 of a Guest Host (GH) mode using a conventional quarter-wavelength plate. The reflective type liquid crystal display device 101 is composed of light-passing substrates 102 and 103, a liquid crystal layer 104, transparent electrodes 107 and 109, orientation films 108 and 110, a quarter-wavelength plate 111, and a reflector plate 112. It is assumed here that the liquid crystal layer 104 flanked by the light-passing substrates 102 and 103 made of glass includes dichroic dye 106, and the liquid crystal has a positive dielectric constant anisotropy.

The belt-like transparent electrodes 107 and 109 are provided on the respective surfaces 102a and 103a, of the light-passing substrates 102 and 103, facing the liquid crystal layer 104. The light-passing substrates 102 and 103 are disposed so that the transparent electrodes 107 and 109 cross at right angles. The orientation films 108 and 110 are provided on the transparent electrodes 107 and 109 provided on the light-passing substrates 102 and 103. The surfaces of the orientation films 108 and 110 receive rubbing or other treatment to orientate liquid crystal molecules 105 of the liquid crystal layer 104 parallel to the substrates. The light-passing substrates 102 and 103 are disposed so that the directions in orientation treatment of the orientation films 108 and 110 are parallel to each other. Besides, the quarter-wavelength plate 111 and the reflector plate 112 are disposed in this order on the surface 103b, of the light-passing substrate 103, facing the liquid crystal layer 104. The quarter-wavelength plate 111 is disposed so that the optic axis thereof forms an angle of 45° to the direction in rubbing orientation treatment of the liquid crystal molecules 105.

Display in a GH mode exploits the absorption coefficient anisotropy of the dichroic dye added to the liquid crystal layer. For example, if dichroic dye having a bar structure is used, since the dye molecules have properties to become orientated parallel to the liquid crystal molecules, it becomes possible to change the orientation state of the dye molecules by changing the orientation state of the liquid crystal molecules with the application/non-application of an electric field.

For example, since the p type dye has an absorption axis, i.e. a transitional dipole moment, practically parallel to the longer axes of the molecules, the p type dye absorbs the polarization component parallel to the longer axes substantially, but absorbs little of the polarization component perpendicular thereto. The absorption coefficient for light of the dichroic dye varies, in this manner, depending upon the directions of the molecular axes, thereby effecting bright and dark display.

Here, referring to the FIGS. 26(a) and 26(b), the following description will explain the principles of the operation of the reflective type liquid crystal display device 101. The explanation will deal with the case where the p type dye is used as the dichroic dye 106 and black & white display is carried out.

FIG. 26(a) shows a state where no voltage is applied, while FIG. 26(b) shows a state where voltage is applied. In the state where no voltage is applied, the liquid crystal molecules 105 are orientated along the direction in the orientation treatment of the orientation films 108 and 110. Therefore, the dichroic dye 106 is also orientated along the direction in the orientation treatment of the orientation films 108 and 110. Part of incident light 113 on the side of the light-passing substrate 102, i.e., light 113a having the vibration plane parallel to the longer axes of the molecules of the dichroic dye 106, is absorbed by the dichroic dye 106. Other part to the light 113, i.e., light 113b having the vibration plane perpendicular to the longer axes of the molecules of the dichroic dye 106, passes through the liquid crystal layer 104. The light 113b is circularly polarized as it passes the quarter-wavelength plate 111, and is circularly polarized in the opposite direction as it is reflected by the reflector plate 112. Subsequently, the light 113b becomes light 113a having the vibration plane parallel to the longer axes of the molecules of the dichroic dye 106 as it passes the quarter-wavelength plate 111 again, and is absorbed by the dichroic dye 106. Therefore, the reflective type liquid crystal display device 101 can carry out dark display.

Meanwhile, in the state where voltage is applied, the liquid crystal molecules 105 are orientated along the direction of the electric field. Therefore, the dichroic dye 106 is also orientated along the direction of the electric field. The incident light 113, is not absorbed by the dichroic dye 106, passes through the liquid crystal layer 104, does not change the polarization state thereof as it passes through the quarter-wavelength plate 111, is reflected by the reflector plate 112, passes through the quarter-wavelength plate 111 again, and enters the liquid crystal layer 104. Since the light 113 is not absorbed by the dichroic dye 106, the light 113 exits the liquid crystal layer 104 without changing at all. Therefore, the reflective type liquid crystal display device 101 can carry out bright display.

The reflective type liquid crystal display device 101 is disclosed, for instance, by Japanese Laid-Open Patent Application No. 52-129450/1977 (Tokukaisho 52 -129450). Besides, Japanese Laid-Open Patent Application No. 54-26756/1979 (Tokukaisho 54-26756) discloses technology to carry out dark display with voltage applied and bright display with no voltage applied in the arrangement of the above reflective type liquid crystal display device 101, by adding dye to Host crystal having an orientation film of slanting perpendicular orientation and having Guest Host liquid crystal of a negative dielectric constant anisotropy.

In the reflective type liquid crystal display device 101, the performance of the reflector plate 112 dictates display quality. That is, if the reflector plate used for such display principle does not preserve the polarization of incident light, the clockwise polarized light is not effectively transformed to the anti-clockwise polarized light, or vice versa, as mentioned above. As a result, light leaks during dark display, contributing to a reduction of contrast.

An example of reflector members capable of preserving polarization is a flat mirror-surface reflector member. However, the mirror-surface reflector member reflects the images of external objects at the surface thereof, and causes new problems: namely, reflections of nearby objects appear on the surface, overlapping the displayed image in the bright state, and visibility is seriously degraded. The reflector plate therefore has light diffusion characteristics as well.

A reflector plate is essential which can both preserve the light diffusion characteristics and control the polarization. Japanese Laid-Open Patent Application No. 7-218906/1995 (Tokukaihei 7-218906), as an example, discloses a reflector plate composed of a concave-convex portion made of smooth photosensitive resin and a aluminum film provided thereon. The application reports that 50% or more of the polarization should be preserved to achieve the contrast of 4 or more and that 70% or more of the polarization should be preserved to achieve the contrast of 7 or more. For these reasons, it has been impossible to obtain a reflector plate with properties that can achieve both the diffusion and the impeccable preservation of polarization.

The incident light entering the reflective type liquid crystal display device 101 passes through the liquid crystal layer 104, passes through the light-passing substrate 103, is reflected, passes through the light-passing substrate 103 again, and exits. Therefore an observer watching the display in an orthogonal direction observes double images caused by the thickness of the glass, which means that the display quality of the reflective type liquid crystal display device 101 is degraded. The double images can be eliminated to some extent by forming the reflector plate and the quarter-wavelength plate inside the liquid crystal layer. However, unless the concave-convex shapes on the above reflector plate preserving the polarization are made as small as possible, the quarter-wavelength plate varies in thickness depending upon where it is measured, resulting in a lower display quality. Japanese Laid-Open Patent Application No. 8-106087/1996 (Tokukaihei 8-106087) therefore discloses technology to form a planarization film on the concave-convex shapes of the reflector plate, which creates a new problem of an increase in the number of steps in manufacture.

Incidentally, in recent years, we have seen rapidly expanding adoption of liquid crystal display devices in various kinds of information and audio-visual display devices such as notebook type personal computers and portable television sets. Among the reflective type liquid crystal display devices, those carrying out display by reflecting ambient light that enters from outside are especially getting attention, because they require no backlight as light sources, consume less power, and can be made thin and light in weight.

Conventionally, the reflective type liquid crystal display device has adopted a liquid crystal display element of either TN (Twisted Nematic) method or STN (Super Twisted Nematic) method. However, in terms of display principles, such a liquid crystal display element needs to be flanked by a pair of polarizer plates and provided thereon with a reflector plate. This creates a problem of double image, because the thickness of the glass substrate in the liquid crystal display device causes visibility to vary depending upon the angle at which the user looks at the glass substrate, i.e. the angle of the direction at which the user looks at the liquid crystal display device to the normal of the glass substrate.

Japanese Laid-Open Patent Application No. 55-48733/1980 (Tokukaisho 55-48733) discloses a liquid crystal display device of a reflective type TN method using a single polarizer plate and a quarter-wavelength plate. The liquid crystal display device adopts a liquid crystal layer twisted by 45° between the upper and lower substrates flanking the liquid crystal layer, and carries out bright and dark display by switching the polarizer plate of incident linearly polarized light between two states where the polarization is parallel, and makes 45°, to the optic axis of the quarter-wavelength plate by way of the controls of applied voltage. The liquid crystal display device is composed of, to name from the light-entering side, a polarizer plate, a 45°-twisted liquid crystal display element including a liquid crystal layer twisted by 45° between the substrates flanking the liquid crystal layer, a quarter-wavelength plate, and a reflector plate.

The following description will explain a voltage control method for a display state of the aforementioned prior art.

Linearly polarized light from the polarizer plate enters the liquid crystal layer on the light-entering side, and passes through the liquid crystal layer while rotating the plane of the polarized light according to the twist of the orientation of the liquid crystal, becomes light having a vibration direction parallel to the slow axis or the advanced phase axis of the quarter-wavelength plate, and enters the quarter-wavelength plate. The linearly polarized light having a plane of polarized light parallel to the optic axis of the quarter-wavelength plate passes through the quarter-wavelength plate with the linearly polarized state being preserved, and reflected by the reflector plate. The reflected light, in the same manner as upon the entering, passes through the quarter-wavelength plate without changing at all, passes through the liquid crystal layer while rotating the plane of polarized light according to the twist of the orientation of the liquid crystal, and as a result, becomes linearly polarized light having a plane of polarized light in the same direction as upon the entering. The exiting light passes through the polarizer plate, effecting bright display.

Meanwhile, in a state where the twist is eliminated by applying voltage to the liquid crystal layer, linearly polarized light from the polarizer plate passes through the liquid crystal layer without rotating the plane of polarized light and therefore without changing at all, and enters at about 45° with respect to the optic axis of the quarter-wavelength plate. The light then is changed in the polarization state to, for example, clockwise circularly polarized light by the quarter-wavelength plate, and enters the reflector plate. The circularly polarized light reflected by the reflector plate reverses the direction in which it proceeds, and becomes anti-clockwise circularly polarized light. The light, reflected and passing through the quarter-wavelength plate again, becomes linearly polarized light having a plane of polarized light perpendicular to the linearly polarized light that enters the quarter-wavelength plate upon the entering, and passes through the untwisted liquid crystal layer in the direction opposite to that upon the entering without being modified at all. Since the plane of polarized light is not rotated in the same manner as upon the entering, the light becomes linearly polarized light in an absorption direction of the polarizer plate, effecting dark display. In the description above, the polarization state after the incident light passes through the liquid crystal layer and the quarter-wavelength plate is clockwise circularly polarized light. However, the same effect is produced with the polarization state being anti-clockwise. In short, the prior art carries out display by modulating with the liquid crystal layer the plane of the linearly polarized light entering the quarter-wavelength plate.

A possible disposition, besides the disposition for carrying out dark display with voltage applied and bright display with no voltage applied in this manner (hereinafter, will be referred to as Normally White disposition), is to displace the placement direction of the optic axis of the quarter-wavelength plate by 45° in order to carry out dark display with no voltage applied and bright display with voltage applied (hereinafter, will be referred to as Normally Black disposition). In such a case, the vibration direction of the linearly polarized light is transformed by the quarter-wavelength plate when no voltage is applied.

Normally Black and Normally White are the same in that a liquid crystal cell subjected to orientation of a twist angle of 45° is disposed between a single polarizer plate and a quarter-wavelength plate, and that a single polarizer plate permits display similar to the display performed by a conventional TN type liquid crystal display device.

However, in the display principles for the conventional reflective type liquid crystal, unless the reflector plate preserves good polarization, the aforementioned transformation from clockwise circularly polarized light to anti-clockwise circularly polarized light, and vice versa, and the transformation from linearly polarized light to linearly polarized light are conducted with less efficiency, reducing contrast. So, a flat mirror-surface reflector member may be employed as a reflector plate that preserves polarization. However, as mentioned above, the mirror-surface reflector member reflects the images of nearby objects, which disrupts good viewing in bright display.

To minimize those setbacks, and to diffuse ambient light to the viewing direction as well, a stretched aluminum film for diffusing ambient light needs to be adopted as the reflector plate. However, with such a reflector plate, the aforementioned transformation from clockwise circularly polarized light to anti-clockwise circularly polarized light, and vice versa, and the transformation from linearly polarized light to linearly polarized light are conducted with less efficiency, reducing contrast.

In short, the conventional reflector plate cannot possess both good diffusing properties and good polarization preservation properties.

For example, in the liquid crystal display device disclosed in Japanese Laid-Open Patent Application No. 55-70817/1980 (Tokukaisho 55-70817) including a quarter-wavelength plate and a reflector plate on the exterior of the liquid crystal cell, light passes through different pixels in the liquid crystal layer upon entering and exiting due to the thickness of the back glass of the liquid crystal layer. This results in visibility difference depending upon the viewing angle, limiting the direction in which fine and high-quality display is possible. The present invention has an object to solve those problems and to offer a fine high-contrast reflective type liquid crystal display device free from viewing angle dependency.

SUMMARY OF THE INVENTION

In view of the problems, an object of the present invention is to offer a reflective type liquid crystal display device that possesses both good diffusing properties and good polarization preservation properties at the same time.

To achieve the above object, the present invention has a liquid crystal display element provided with:

a quarter-wavelength plate; and a pair of substrates, each substrate being provided with a transparent electrode, the reflective type liquid crystal display device carrying out display by using ambient light, said element, comprising:

a reflector member, possessing an excellent polarization preservation property, for reflecting incident light; and a complex member, composed of a complex of liquid crystal and a polymer, for selectively diffusing incident light.

Conventionally, a reflector member possessing an excellent polarization preservation property cannot be used, because the reflection of surroundings appears on the display device. By contrast, with the above arrangement, since a complex member for selectively diffusing incident light is provided, the diffusion prevents the reflection of surroundings to appear during bright display and improves visibility. Besides, since the reflector member has an excellent polarization preservation property, conventional problems of leaking light and degraded contrast caused by a poor polarization preservation property during dark display are surely eliminated. For these reasons, the present invention can offer a high contrast reflective type liquid crystal display device capable of effecting darker black display and brighter white display.

The complex member is preferably arranged to diffuse only light polarized in a particular direction while preserving the direction of polarization of the light, and used in a combination with a liquid crystal layer composed of liquid crystal and dichroic dye having a transitional dipole moment at least in a direction of a longer axis of a molecule of the liquid crystal.

In addition, the complex member is disposed between the substrate and the reflector member, and is arranged as a liquid crystal layer of liquid crystal orientated with a twist angle in a range of 40° to 50°, and the quarter-wavelength plate is disposed between the reflector member and the liquid crystal layer.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a process chart for fabricating the reflective type liquid crystal display device.

FIG. 15 is a cross-sectional view showing a liquid crystal display device of yet another embodiment in accordance with the present invention.

DESCRIPTION OF THE EMBODIMENTS

The following description will discuss an embodiment in accordance with the present invention in reference to drawings.

Figure 1:
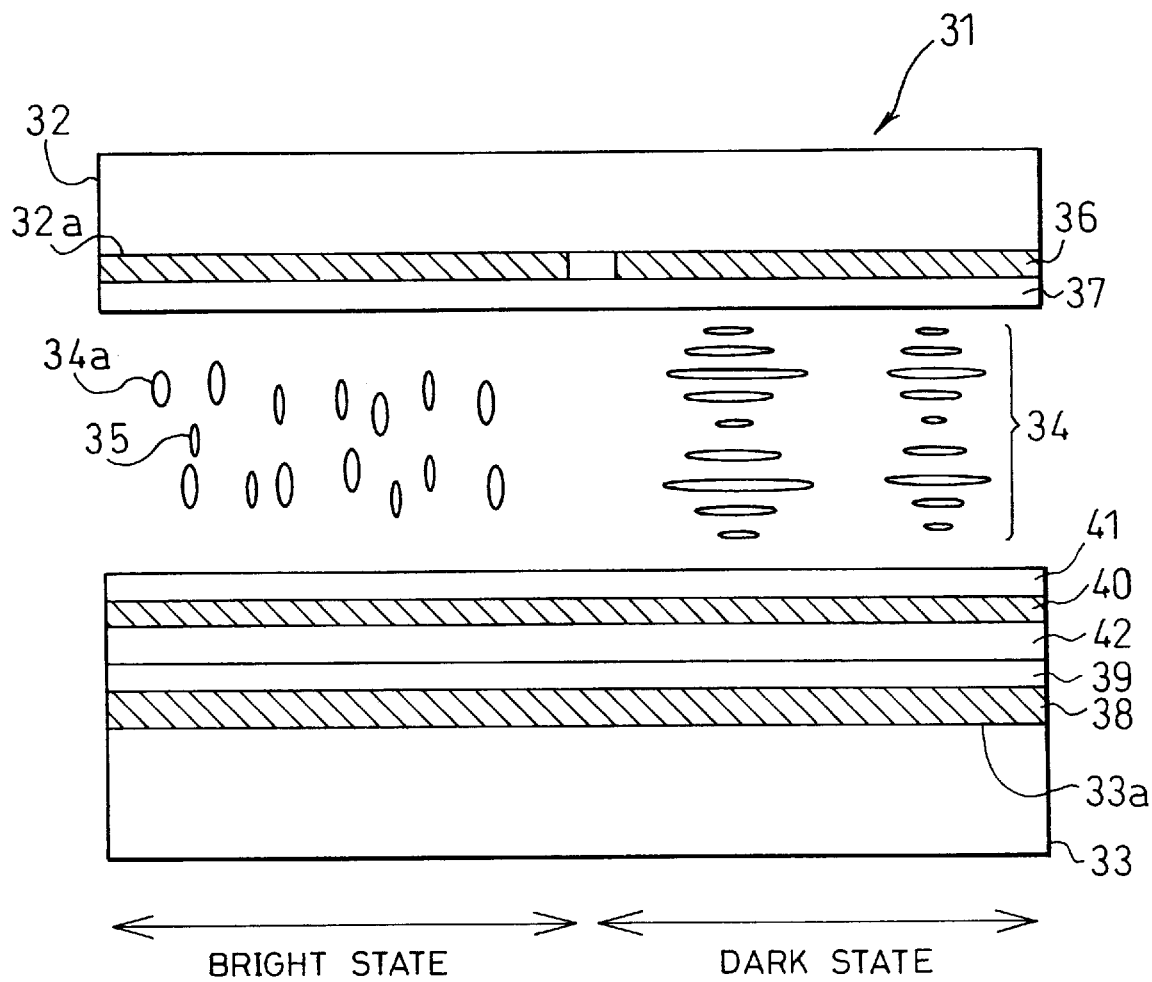
FIG. 1 is a cross-sectional view showing an arrangement of a reflective type liquid crystal display device of an embodiment in accordance with the present invention.

FIG. 1 is a cross-sectional view showing an arrangement of a reflective type liquid crystal display device 31 of a Guest Host mode using an anisotropic diffusing film, which is the first embodiment in accordance with the present invention. The reflective type liquid crystal display device 31 is composed of substrates 32 and 33, a liquid crystal layer 34, dichroic dye 35, transparent electrodes 36 and 40, orientation films 37 and 41, a reflector film 38, a quarter-wavelength plate 39, and an anisotropic diffusing film 42.

The substrates 32 and 33 are made of an insulating material such as glass, quartz, or plastic, and at least the substrate 32 is made of a light-passing material. The liquid crystal layer 34, disposed between the substrates 32 and 33, includes nematic liquid crystal having a positive dielectric constant anisotropy and the so-called p type dichroic dye 35 having a transitional dipole moment practically parallel to the longer axis of the molecule. On the surface, of the substrate 32, facing the liquid crystal layer 34 is provided a transparent electrode ITO (Indium Tin Oxide) 36 having switching element realized by a dipole element such as a varistor using, for example, ZnO and an MIM (Metal-Insulator-Metal) element using $Ta_2O_5$. On the transparent electrode 36 is provided the orientation film 37 made of, for example, a polyimide resin. The surface of the orientation film 37 receives orientation treatment by, for example, rubbing treatment so as to uniformly orientate the liquid crystal molecules 34 a in a single horizontal direction to the substrate 32.

Meanwhile, the reflector film 38 made of, for example, aluminum so as to be in contact with the substrate 33 and the quarter-wavelength plate 39 made of a polymer film, such as a polymer liquid crystal film, polystyrene polypropylene, polycarbonate, or polyethyleneterephthalate, are provided in this order on the surface 33a, of the substrate 33, facing the liquid crystal layer 34. The polymer film is adjusted in film thickness and extension to have a retardation value one fourth of 550 nm, i.e., about 137.5 nm.

Moreover, the anisotropic diffusing film 42 is formed on the surface of the quarter-wavelength plate 39. The transparent electrode 40 and the orientation film 41 are formed in this order on the anisotropic diffusing film 42. The orientation film 41, like the orientation film 37, is composed of, for example, a poly imide resin, and the surface thereof receives orientation treatment such as rubbing treatment.

FIG. 2 shows the process of manufacturing the reflective type liquid crystal display device 31. The following description will explain the manufacturing in connection with the process.

In the first step, the reflector film 38 is formed on the surface 33a of the substrate 33. The reflector film 38, made of aluminum, is formed by sputtering the aluminum.

In the second step, the quarter-wavelength plate 39 is formed on the reflector film 38. The quarter-wavelength plate 39 is formed to have a thickness of 0.62 μm by applying a solution of an acrylic liquid crystal polymer with a spinner.

In the third step, the anisotropic diffusing film 42 is formed on the quarter-wavelength plate 39. The anisotropic diffusing film 42 of the present embodiment is formed of a complex of polymer and liquid crystal having received orientation treatment. In other words, the orientation film (not shown) is formed on the quarter-wavelength plate 39 on the reflector film 38 and rubbed. A complex film formed by diffusing liquid crystal and a photoreactive polymer in a solvent is applied onto the orientation film and irradiated with ultraviolet light. Then phase separation is conducted to form the anisotropic diffusing film 42. In the phase separation, the liquid crystal composing the anisotropic diffusing film 42 becomes uniformly orientated along the orientation direction of the orientation film, while the polymer produced by polymerization with ultraviolet light does not.

In the fourth step, the transparent electrode 40 is formed on the anisotropic diffusing film 42. The transparent electrode 40, made of ITO, is formed by applying ITO to the whole surface, and then patterned by photo lithography.

In the fifth step, the orientation film 41 is formed on the transparent electrode 40. The orientation film 41, made of a polyimide resin, is formed by applying the polyimide resin to the whole surface, and carrying out rubbing treatment on the surface thereof. The direction in rubbing treatment is formed so as to make approximately 45° to the optic axis of the quarter-wavelength plate 39.

In the sixth step, a switching element is formed on the surface 32a of the substrate 32.

In the seventh step, the transparent electrode 36 is formed on the surface 32a of the substrate 32 on which the switching element has been formed.

In the eighth step, the orientation film 37 is formed on the transparent electrode 36. The orientation film 37 is formed in the same manner as in the fifth step.

In the ninth step, the substrates 32 and 33 are combined so that the surface 32a, of the substrate 32 opposes the surface 33a, facing the substrate 33 and that the directions in orientation treatment of the orientation films 37 and 41 are mutually parallel. Besides, plastic spacers of, for example, 8 $\mu$m in diameter are inserted between the substrates 32 and 33, keeping the substrates 32 and 33 separated by a fixed distance.

In the tenth step, liquid crystal containing the dichroic dye 35 is injected between the substrates 32 and 33 to form the liquid crystal layer 34. In the eleventh step, the injection port through which liquid crystal is injected in step 10 are sealed.

Figure 3A:
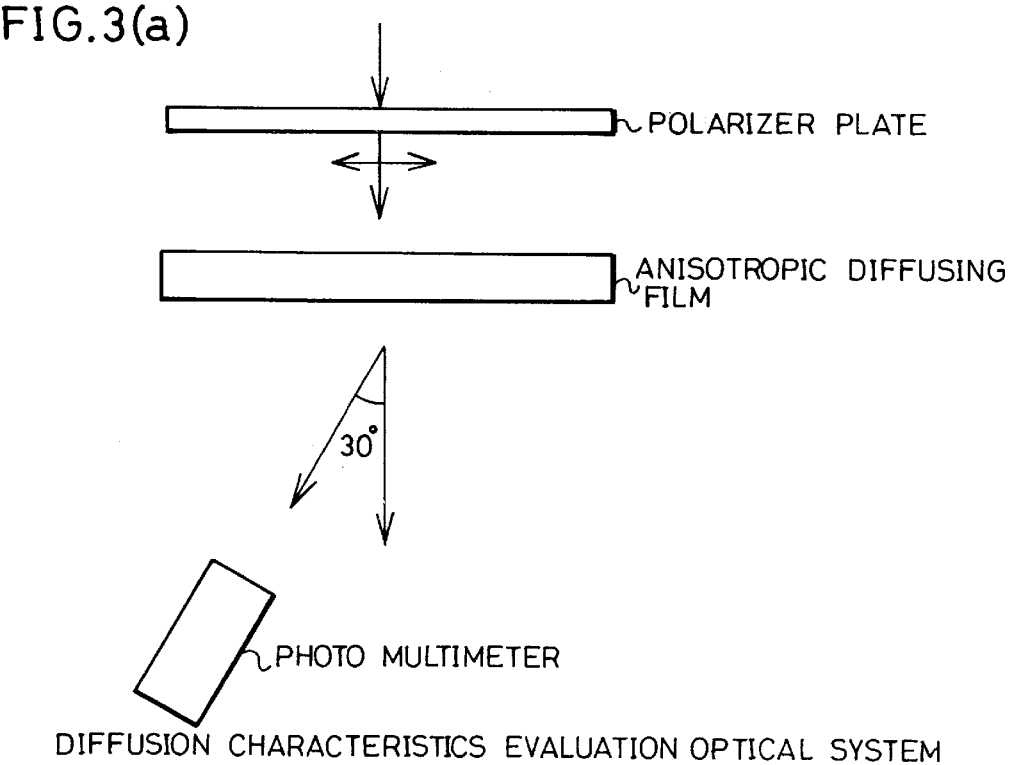
FIGS. 3(a) and 3(b) are an explanatory drawing showing an optical system for evaluating an anisotropic diffusing film of the reflective type liquid crystal display device.
Figure 3B:
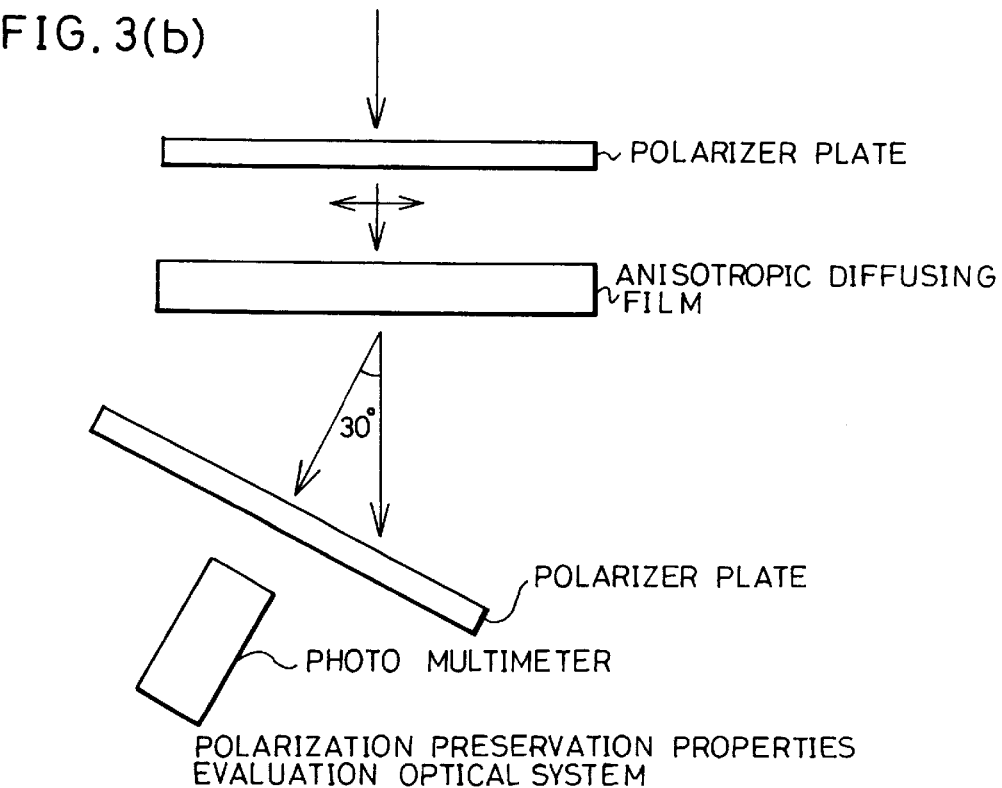

The following description will explain properties of the anisotropic diffusing film 42 formed in the step 3. The anisotropic diffusing film of the first embodiment is evaluated with two kinds of optical systems respectively shown in FIGS. 3(a) and 3(b). First, as shown in FIG. 3(a), a polarizer plate is placed on the light-entering side, and linearly polarized light is directed to enter the anisotropic diffusing film. The diffusion intensity of light at 30° to the normal is measured with a photo multimeter. Note that a sample of the anisotropic diffusing film is formed on a substrate and the sample itself is rotated 360° in the planar direction $\psi$. Next, as shown in FIG. 3(b), an additional polarizer plate is placed on the light-exiting side of the anisotropic diffusing film to create the crossed-Nicols conditions, and the sample is rotated in the same manner as above to measure the polarization of diffused light.

Figure 4:
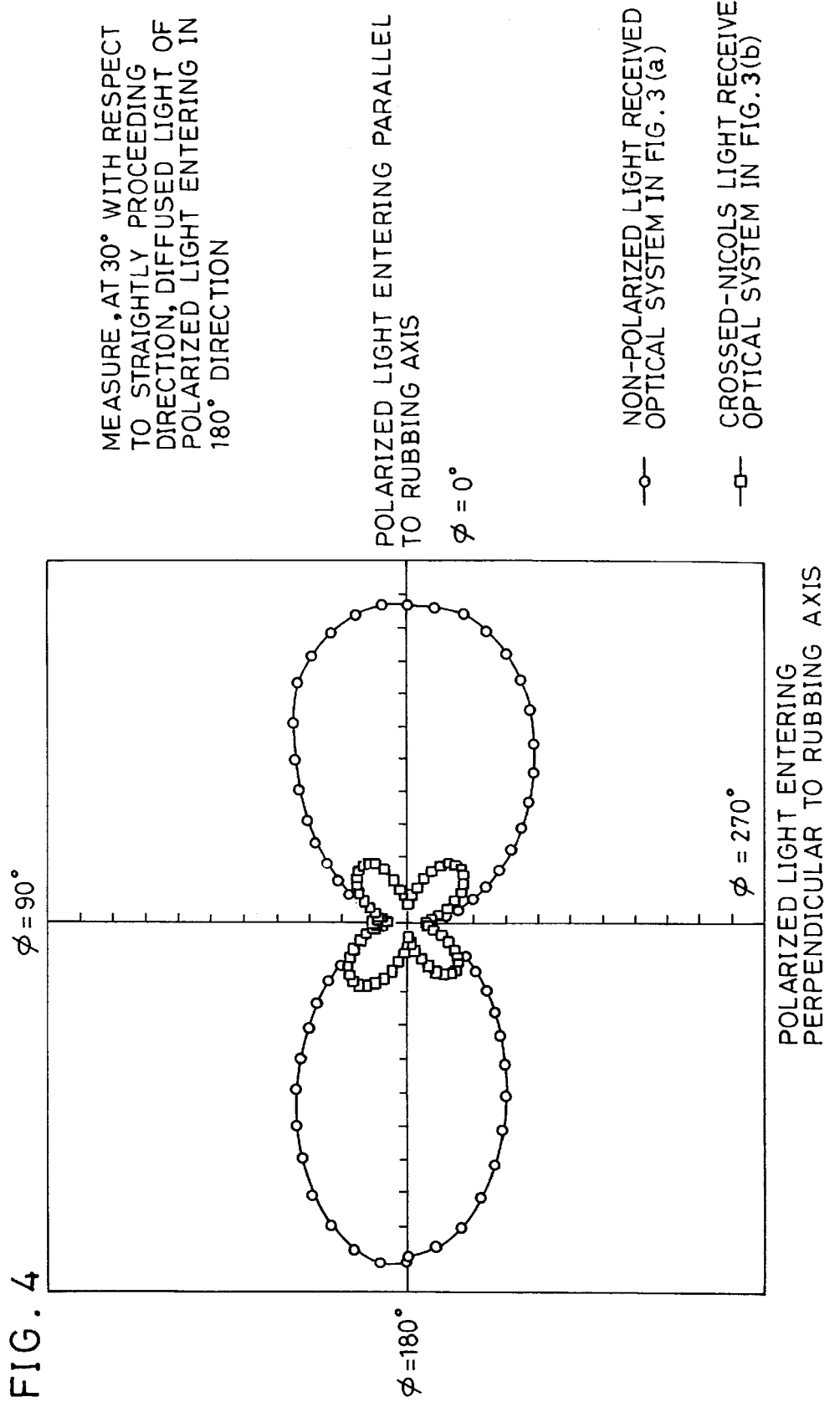
FIG. 4 is an explanatory drawing showing results of measurement of optical characteristics of the anisotropic diffusing film.

FIG. 4 shows results of the measurement with the measuring systems. As shown in FIG. 4, when the optical system in FIG. 3(a) is used, diffused light is observed only at $\psi=0°$ and 180°. It is therefore understood that the anisotropic diffusing film diffuses incident light polarized parallel to the direction of rubbing orientation, and that the anisotropic diffusing film diffuses little incident light polarized perpendicular to the direction of rubbing orientation and allows the light to pass therethrough. As shown in FIG. 3(b), the results of the evaluation indicate that the intensity of diffused light at $\psi=0°$ and 180° is little observed, and that the light is absorbed by a polarizer plate. It is therefore understood that the light, although being diffused, is preserving the direction of polarization.

Figure 5:
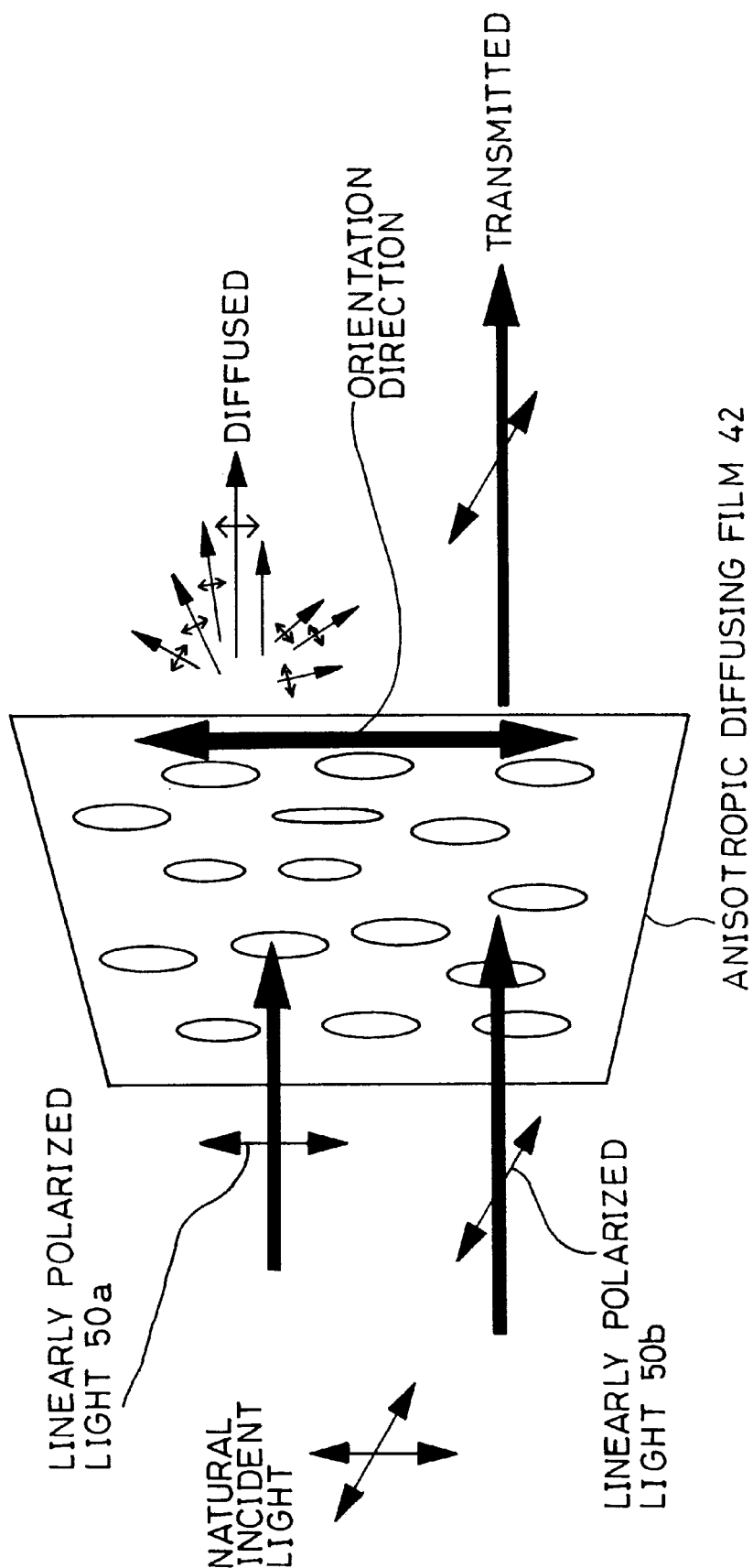
FIG. 5 is a schematic view showing operations by the anisotropic diffusing film.

Based on the above results, FIG. 5 illustrates how the diffusion takes place. Specifically, the anisotropic diffusing film diffuses light, 50a, but does not diffuse light, 50b, polarized linearly and perpendicular to the orientation direction. Moreover, it is confirmed that the anisotropic diffusing film 42 mostly diffuses light forward and diffuses incident light forward with little loss.

Figures 6A, 6B:
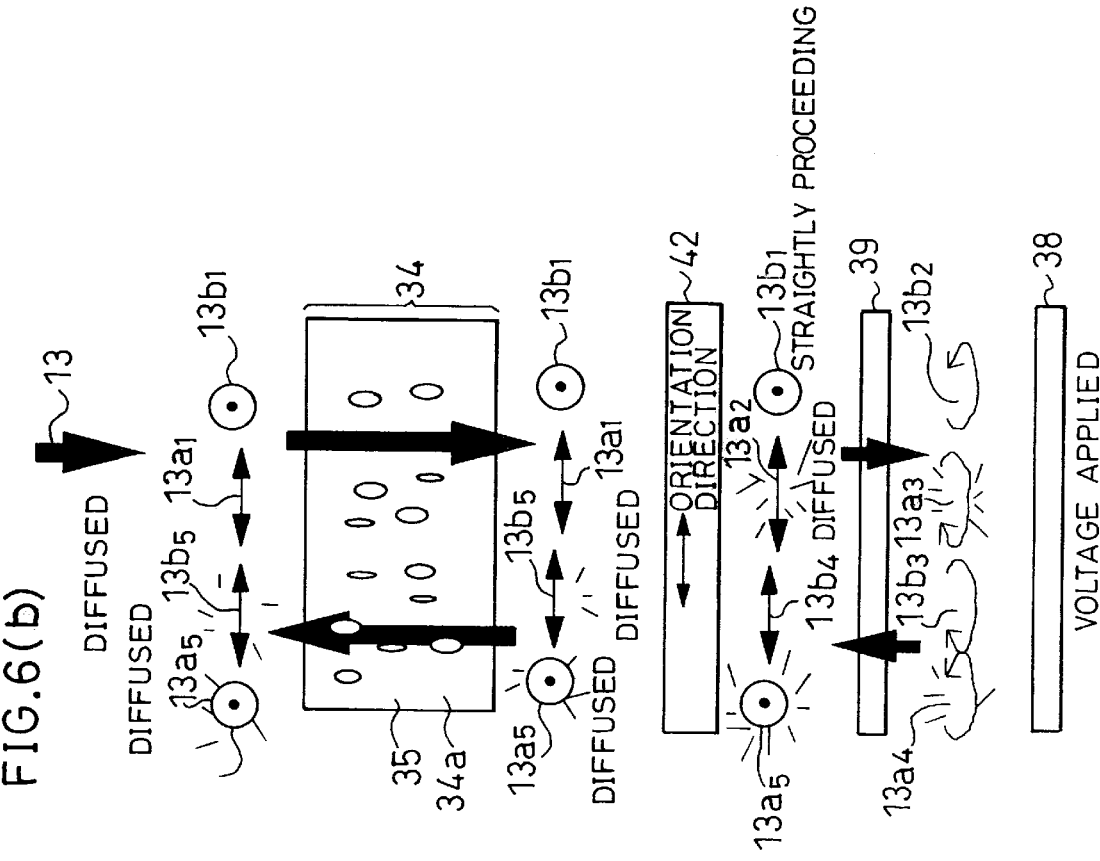
FIGS. 6(a) and 6(b) are explanatory drawings showing operation principles of the reflective type liquid crystal display device.

Referring to FIG. 6, the following description will explain the operation of the reflective type liquid crystal display device 31 for bright and dark display. It is supposed that the light radiating from ambient light 13 is represented by the light $13a_1$ linearly polarized in one of the two directions and the light $13b_1$ linearly polarized in the other direction perpendicular thereto. In FIG. 6(a) where no voltage is applied, the liquid crystal molecules 34a are orientated in the direction in the orientation treatment of the orientation films 37 and 41, i.e. in a direction parallel to the substrates 32 and 33. So is the dichroic dye 35. As the incident light 13 on the side of the substrate 32 enters the liquid crystal layer 34, the linearly polarized light $13a_1$, which has the vibration plane parallel to the longer axes of the molecules of the dichroic dye 35, is absorbed by the dichroic dye 35. The linearly polarized light $13b_1$, which has the vibration plane perpendicular to the longer axes of the molecules of the dichroic dye 35, passes through the liquid crystal layer 34 and enters the anisotropic diffusing film 42. The anisotropic diffusing film 42 acts differently depending upon the direction of incident linearly polarized light. If the axis is set in such a direction that the light $13b_1$ passes through the anisotropic diffusing film 42 without being diffused by the anisotropic diffusing film 42, the light having passed through the anisotropic diffusing film 42 is composed only of linearly polarized light component (the light $13b_1$) which is not diffused.

Subsequently, the light is transformed into circularly polarized light $13b_2$ by the quarter-wavelength plate 39. As the circularly polarized light $13b_2$ then is reflected by the reflector film 38, the polarization direction of the light is reversed, and the circularly polarized light $13b_2$ becomes circularly polarized light $13b_3$. As the circularly polarized light $13b_3$ passes through the quarter-wavelength plate 39, the circularly polarized light $13b_3$ becomes circularly polarized light $13b_4$. As the circularly polarized light $13b_4$ enters the anisotropic diffusing film again, since the circularly polarized light $13b_4$ is in the direction to be diffused by the anisotropic diffusing film 42, the circularly polarized light $13b_4$ becomes diffused light $13b_5$ having the vibration plane parallel to the longer axes of the molecules of the dichroic dye 35. However, the diffused light $13b_5$, since having the vibration plane in the same direction as does the linearly polarized light $13b_1$, is absorbed by the dichroic dye 35 and preserves the direction of polarization, effecting good dark display.

Meanwhile, when a voltage is applied (see FIG. 6(a)), the liquid crystal molecules 34a are orientated in the direction of the electric field, i.e. in a direction perpendicular to the substrates 32 and 33. So is the dichroic dye 35. As the incident light 13 on the side of the substrate 32 passes unaltered through the liquid crystal layer 34 without being absorbed by the dichroic dye 35 and enters the anisotropic diffusing film 42. Here, the light $13b_1$ polarized linearly in a direction not to be diffused by the anisotropic diffusing film 42 passes unaltered through the anisotropic diffusing film 42, while the other light $13a_1$ polarized in a direction perpendicular thereto is transformed into diffused light $13a_2$ by the anisotropic diffusing film 42 with the polarization being preserved. Next, the linearly polarized light $13b_1$ and the diffused light $13a_2$ are transformed into circular polarized light $13b_2$ and circular polarized light $13a_3$ respectively by the quarter-wavelength plate 39, and then reflected by the reflector film 38. The reflection reverses the polarization directions of the linearly polarized light $13b_2$ and $13a_3$, rendering the linearly polarized light $13b_3$ and $13a_4$. As the linearly polarized light $13b_3$ and $13a_4$ pass through the quarter-wavelength plate 39 again, the linearly polarized light $13b_3$ and $13a_4$ are transformed into linearly polarized light $13b_4$ and $13a_5$. As the linearly polarized light $13b_4$ and $13a_5$ enter the anisotropic diffusing film 42 again, since the linearly polarized light $13b_4$ becomes light in the direction to be diffused (light having the vibration plane in the same direction as does the linearly polarized light $13a_1$), the linearly polarized light $13b_4$ shows good diffusion characteristics, and exits without being absorbed by the liquid crystal layer 34. Meanwhile, since the linearly polarized light 13 as becomes light in the direction to be diffused (light having the vibration plane in the same direction as does the linearly polarized light $13b_1$), the linearly polarized light 13 as passes through the anisotropic diffusing film 42, and exits without being absorbed by the liquid crystal layer 34. In other words, since both the two polarized light components $13a_1$ and $13b_1$ of external light are diffused (the diffused light $13a_5$ and $13b_5$), and good bright display is effected.

Figure 7:
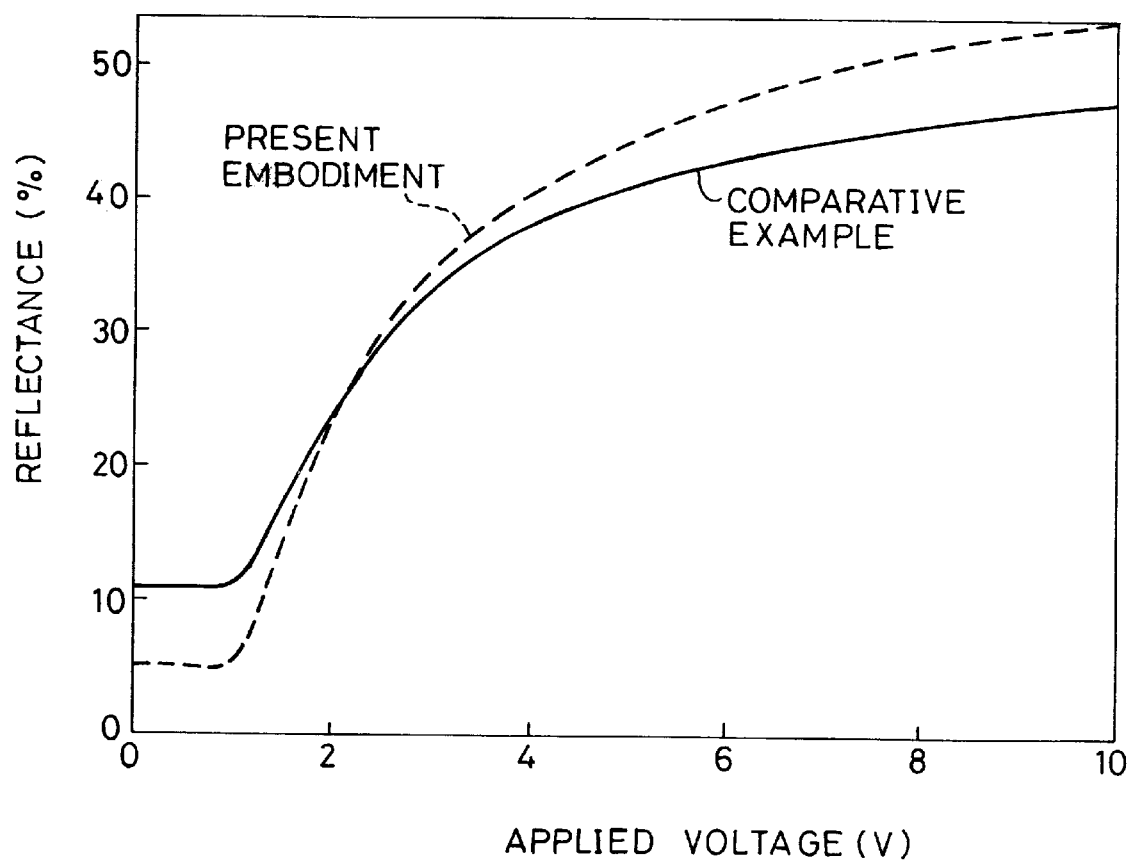
FIG. 7 is an explanatory drawing showing display characteristics of the reflective type liquid crystal display device.
Figure 8:
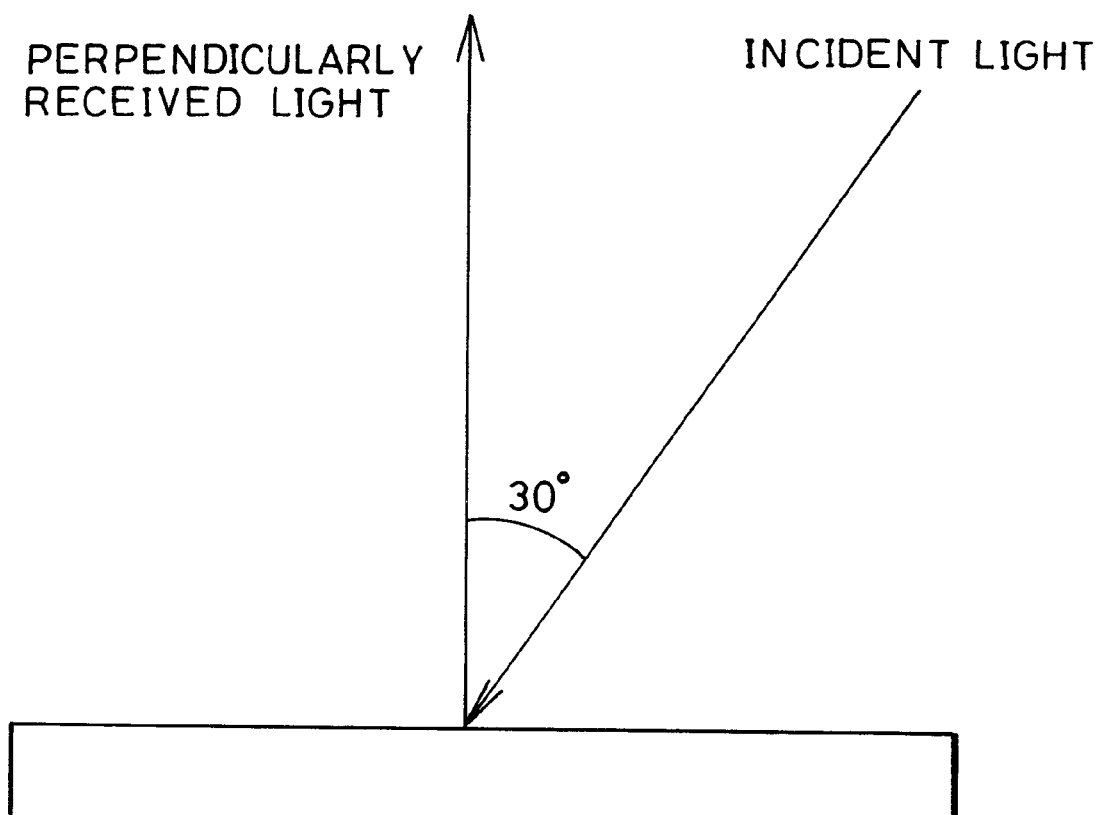
FIG. 8 is an explanatory drawing showing a measuring method for the reflective type liquid crystal display device.
Figure 27:
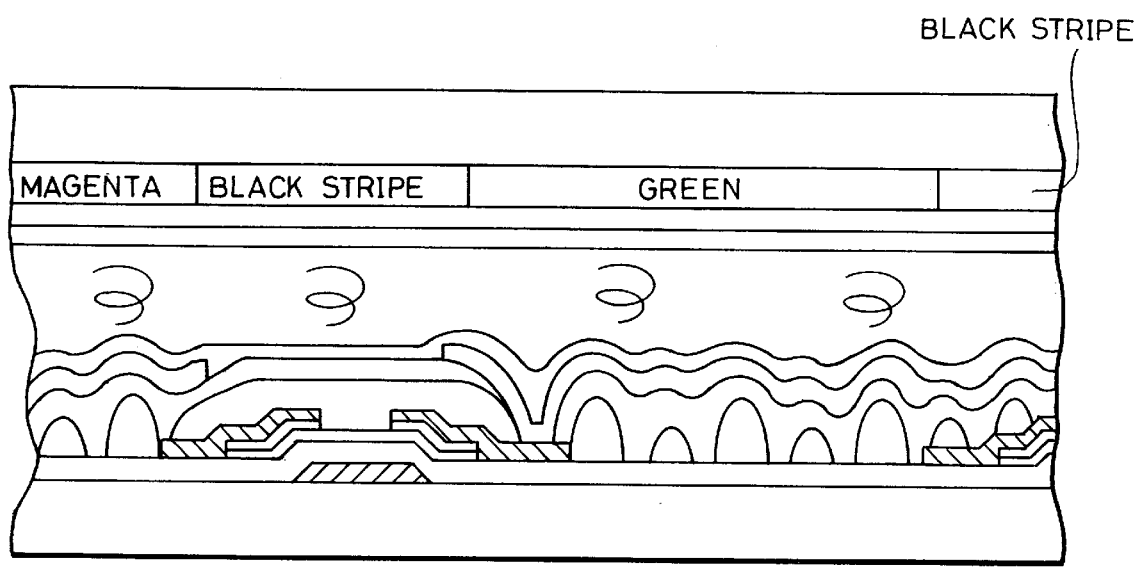
FIG. 27 is a cross-sectional view showing a reflective type liquid crystal element using a conventional diffusing reflector plate.

FIG. 7 shows a characteristic of a reflective type liquid crystal display device using a conventional concave-convex diffusion reflector plate shown in FIG. 27 (disclosed in Japanese Laid-Open Patent Application No. 6-27481/1994 (Tokukaihei 6-27481) by the same inventors as the present invention) as a comparative example illustrating a characteristic of the reflective type liquid crystal display device 31 of the first embodiment. This shows measurements of brightness and contrast by using the optical system shown in FIG. 8 under the front light-receiving conditions of the incident angle of 30° and with an assumption that the reflectance of the standard diffusing plate is 100%. It is found out that the embodiment shows both higher brightness and higher contrast.

As explained above, the light entering the reflective type liquid crystal display device 31 of the first embodiment can effect dark display free from diffusion and bright display in the diffused state, greatly improving display quality.

In the present embodiment, the transparent electrode 40 is used as an electrode of the substrate 33 for driving the liquid crystal layer 34. However, the reflector film 38 may be exploited as the electrode. In such event, the manufacturing process becomes simpler, which is advantageous.

Figure 9:
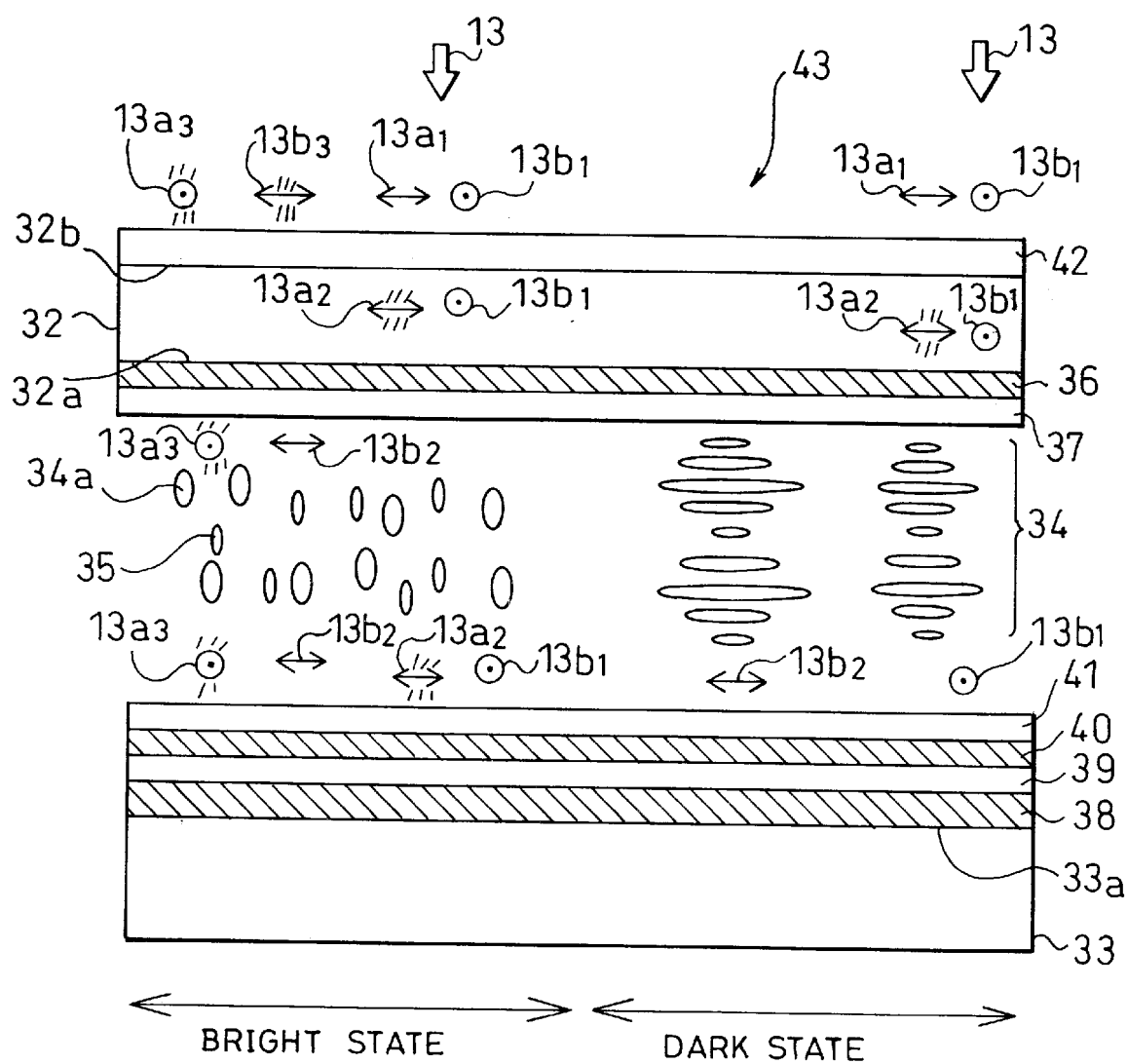
FIG. 9 is a cross-sectional view showing an arrangement of a reflective type liquid crystal display device of another embodiment in accordance with the present invention.

FIG. 9 is a cross-sectional view showing an arrangement of a reflective type liquid crystal display device 43, which is the second embodiment. The reflective type liquid crystal display device 43 is arranged very similarly to the reflective type liquid crystal display device 31 which is the first embodiment, but is different therefrom in that the anisotropic diffusing film provided to the substrate 32 is disposed in a different place. To be more specific, the transparent electrode 36 is formed on the surface 32a, of the substrate 32, facing the liquid crystal layer 34, and the anisotropic diffusing film 42 is placed on the surface 32b of the substrate 32 on the side where light enters. The orientation film 37 is formed on the transparent electrode 36.

Meanwhile, the reflector film 38 and the quarter-wavelength plate 39 are formed in this order on the surface 33a, of the substrate 33, facing the liquid crystal layer 34, and the transparent electrode 40 is formed thereon. An orientation film 41 is formed on the surface 33a of the substrate 33 on which the transparent electrode 40 has been formed.

It is supposed that light (ambient light) 13 entering the reflective type liquid crystal display device 43 arranged as above is represented by the light $13a_1$ linearly polarized in one of the two directions and the light $13b_1$ linearly polarized in the other direction perpendicular thereto. When no voltage is applied (the right-hand half of FIG. 9), the liquid crystal molecules 34a are orientated in the direction in the orientation treatment of the orientation films 37 and 41, i.e. in a direction parallel to the substrates 32 and 33. So is the dichroic dye 35. As the incident light 13 on the side of the substrate 32 enters the anisotropic diffusing film 42. The anisotropic diffusing film 42 acts differently depending upon the direction of incident linearly polarized light. If the axis along which the linearly polarized light $13b$ passes through the anisotropic diffusing film 42 without being diffused is set in a direction perpendicular to the orientation direction of the liquid crystal molecules in the anisotropic diffusing film (set in a direction of the shorter axes of the liquid crystal molecules), the linearly polarized light $13b_1$ passes unaltered through the anisotropic diffusing film 42, while the linearly polarized light $13a_1$ is diffused by the anisotropic diffusing film 42 to become the linearly polarized light $13a_2$. As the linearly polarized light $13b_1$ and $13a_2$ enter the liquid crystal layer 34, the linearly polarized light $13a_2$, which has the vibration plane parallel to the longer axes of the molecules of the dichroic dye 35, is absorbed by the dichroic dye 35. By contrast, the linearly polarized light $13b_1$, which has the vibration plane perpendicular to the longer axes of the molecules of the dichroic dye 35, passes through the liquid crystal layer 34, and becomes circularly polarized light by the quarter-wavelength plate 39. As the linearly polarized light $13b_1$ is reflected by the reflector film 38, the polarization direction of the light is reversed. As the linearly polarized light $13b_1$ passes through the quarter-wavelength plate 39 again, the circularly polarized light $13b_1$ becomes the linearly polarized light $13b_2$, which has the vibration plane in the same direction as does the linearly polarized light $13a$, and enters the liquid crystal layer 34. The linearly polarized light $13b_2$, since having the vibration plane in the same direction as does the linearly polarized light $13a_1$, is absorbed by the dichroic dye 35, effecting good dark display.

Meanwhile, when voltage is applied (the left-hand half of FIG. 9), the liquid crystal molecules 34a are orientated in the direction of the electric field, i.e. in a direction perpendicular to the substrates 32 and 33. So is the dichroic dye 35. As the incident light 13 on the side of the substrate 32 enters the anisotropic diffusing film 42, the linearly polarized light $13b_1$ passes unaltered through the anisotropic diffusing film 42, while the linearly polarized light $13a_1$ is diffused by the anisotropic diffusing film 42 to become the linearly polarized light $13a_2$. The linearly polarized light $13b_1$ and $13a_2$ enter the liquid crystal layer 34, passes unaltered therethrough, and becomes circularly polarized by the quarter-wavelength plate 39. As the linearly polarized light $13b_1$ and $13a_2$ are reflected by the reflector film 38, the polarization of the light is reversed. As the linearly polarized light $13b_1$ and $13a_2$ pass through the quarter-wavelength plate 39 again, the linearly polarized light $13b_1$ becomes the linearly polarized light $13b_2$ having the vibration plane in the same direction as does the linearly polarized light $13a_1$ and enters the liquid crystal layer 34. By contrast, the linearly polarized light $13a_2$ becomes the linearly polarized light $13a_3$ having the vibration plane in the same direction as does the linearly polarized light $13b_1$ and enters the liquid crystal layer 34. The linearly polarized light $13b_2$ and $13a_3$ pass unaltered through the liquid crystal layer 34 and enters the anisotropic diffusing film 42 again. The linearly polarized light $13b_2$ is diffused by the diffusing film 42 and exits as the linearly polarized light $13b_3$, while the linearly polarized light $13a_3$ passes unaltered through the anisotropic diffusing film 42 without being diffused. In other words, since both the two polarized light components 13$a_1$ and 13$b_1$ of external light are diffused, good bright display is effected.

As explained above, the reflective type liquid crystal display device 43 improves display quality under the same principles as those of the first embodiment.

The following description will explain an arrangement of a reflective type liquid crystal display device, which is the third embodiment. The reflective type liquid crystal display device, which is the third embodiment, is arranged very similarly to the first or second embodiment, but is characterized in that the anisotropic diffusing film 42 is made of a complex of a liquid crystalline polymer and fine particles and formed by an extrusion method (will be explained in reference to FIG. 10).

The quarter-wavelength plate 39 is formed on the reflector film 38 on the surface 33$a$, of the substrate 33, facing the liquid crystal layer 34 shown in FIG. 1, and the anisotropic diffusing film 42 made of a liquid crystalline polymer and fine particles is formed thereon. The liquid crystalline polymer used in the present embodiment is made by a material such as a polyester resin that exhibits liquid crystal phase when it melts and exhibits glass phase at room temperature, or a material, such as thermotropic liquid crystalline polymer, having a glass transition temperature higher than room temperature.

The liquid crystal polymer used in the present embodiment has a refraction index for extraordinary light of 1.65 and a refraction index for ordinary light of 1.52. Besides, spherical plastic beads of a few $\mu$m are used as an example of the fine particles. Used as the fine particles in the present embodiment are micro pearls having a refraction index of 1.57. The anisotropic diffusing film in which the liquid crystal polymer and the fine particles are uniformly diffused is formed in the extrusion method explained later. The difference between the refraction indices causes anisotropic diffusion. Moreover, it is confirmed that the anisotropic diffusing film 42, if formed on the light-entering side 32$a$ of the substrate 32 as in the second embodiment, still produces the same effects.

Figure 10:
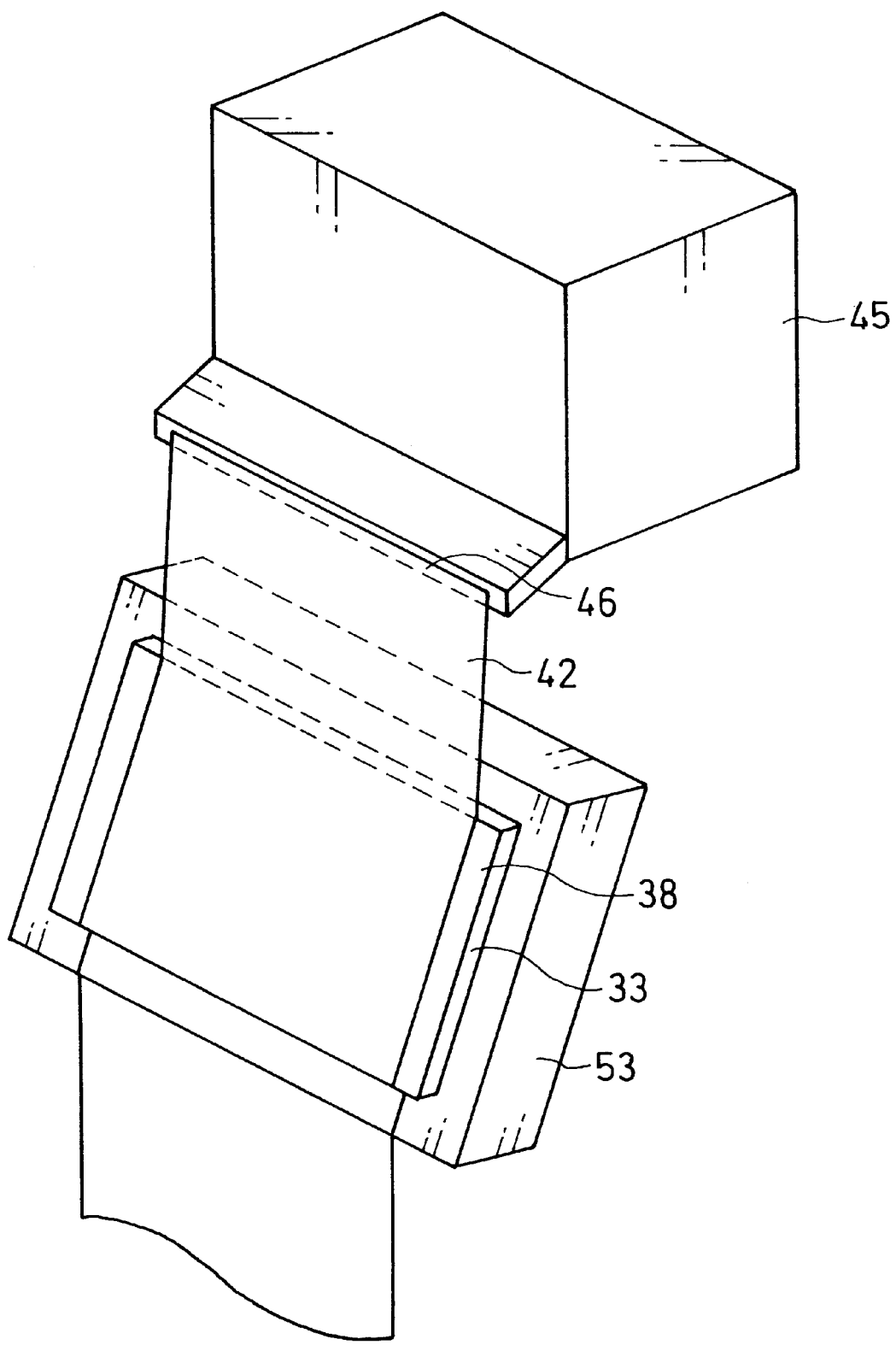
FIG. 10 is a perspective view showing how liquid crystal polymer of still another embodiment in accordance with the present invention is extruded.
Figure 11:
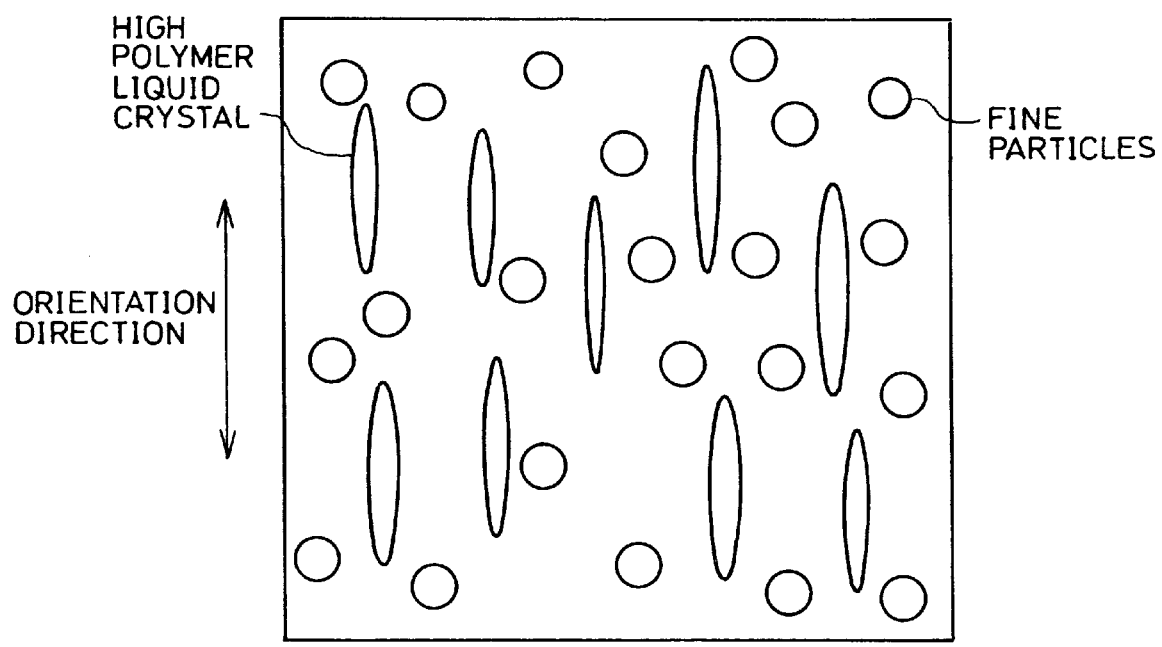
FIG. 11 is a view showing construction of the anisotropic diffusing film of the embodiment shown in FIG. 10.

FIG. 10 is a perspective view illustrating the method for extruding the anisotropic diffusing film 42. The substrate 33 is fixed by vacuum holding method onto a holding member 53 equipped with heating and cooling functions. The liquid crystal polymer 42$a$ and the fine particles 42$b$ (neither is shown) are mixed and heated in a high temperature tank 45 to melt down, i.e., to be in liquid crystal phase. The melted mixture of the liquid crystal polymer 42$a$ and the fine particles 42$b$ is extruded from a slit 46 provided to the high temperature tank 45 at a proper extrusion rate, and adheres to the quarter-wavelength plate on the surface 33$a$. The thickness of the anisotropic diffusing film is adjusted by the temperature at which the film is formed, the extrusion rate, the cooling rate, etc. The diffusion characteristics can be controlled by the refraction index and the ratio of the fine particles added. FIG. 11 shows the construction of the anisotropic diffusing film formed in this manner. It is confirmed that the anisotropic diffusing film formed in this manner have anisotropic diffusion characteristics similar to those shown in FIG. 4.

The reflective type liquid crystal display device of the present embodiment improves display quality, similarly to those of the first and second embodiments.

Figure 12:
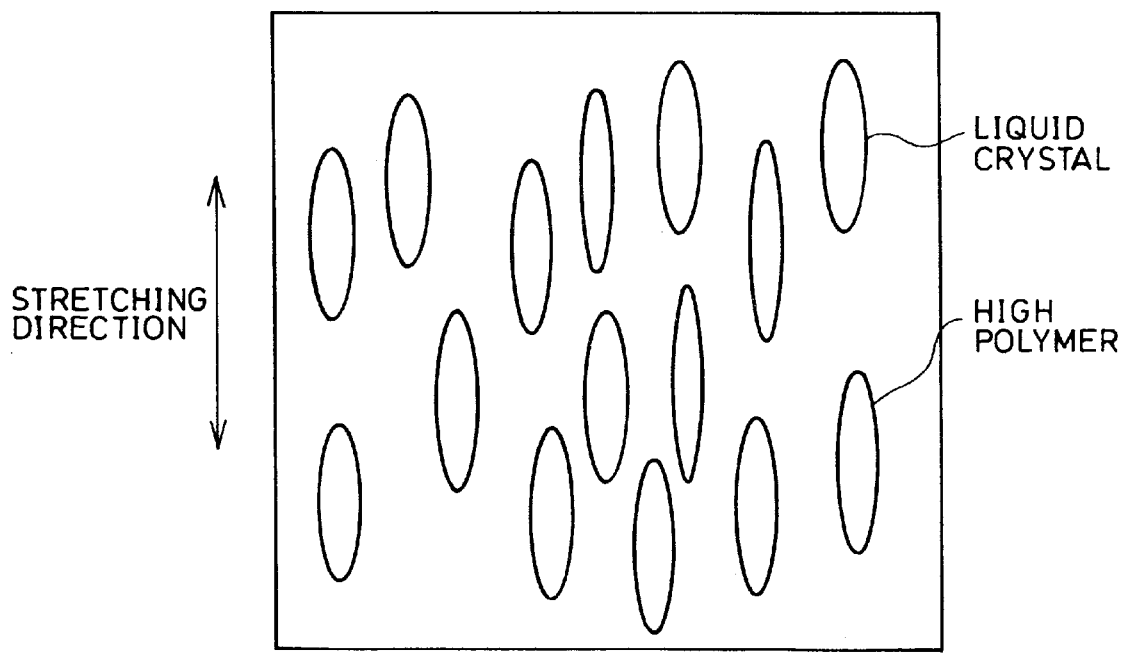
FIG. 12 is a view showing construction of the anisotropic diffusing film of another embodiment in accordance with the present invention.

The reflective type liquid crystal display device, which is the fourth embodiment, is arranged very similarly to the first or second embodiment, but is characterized in that the anisotropic diffusing film 42 of the present embodiment is a complex of liquid crystal and a polymer and is made by stretching the complex. That is, E7 manufactured by BDH Inc. is used as a liquid crystal material. Emulsion method with polyvinyl alcohol (PVA) as a polymer coating film is used to produce a capsule type liquid crystal complex, which is liquid crystal particles covered with polymer coating films 51. The produced liquid crystal particles covered with PVA coating films measure 1 $\mu$m to 6 $\mu$m. The liquid crystal particle emulsion produced, after being applied onto a glass substrate and dried so as to provide a film. The film taken out is stretched about two- to three-fold in a single direction to have a predetermined thickness of about 20 $\mu$m. It is confirmed that the anisotropic diffusing film formed in this manner have anisotropic diffusion characteristics similar to those shown in FIG. 4 of the first embodiment. Moreover, the anisotropic diffusing film 42 is fixed onto the quarter-wavelength plate 39 with a sealing agent. FIG. 12 shows the arrangement of the anisotropic diffusing film 42 formed in this manner. The reflective type liquid crystal display device of the present embodiment improves display quality, similarly to those of the first to third embodiments.

Note that the embodiments above are not for restricting the reflective type liquid crystal display device in accordance with the present invention. The orientation films and liquid crystal, as examples, are merely illustrative, and may be changed or modified within the scope of the present invention.

That is, it is possible to carry out bright display with no voltage applied and dark display with voltage applied by adding dye to Host liquid crystal having an orientation film of slanting perpendicular orientation and having Guest Host liquid crystal of a negative dielectric constant anisotropy. Here, the slanting orientation is achieved by rubbing a perpendicularly orientated film of polyimide in a single direction, and improves display quality as does the first embodiment.

As detailed so far, the present invention greatly improves contrast, and thus improves the display quality of reflective type liquid crystal display devices. Besides, according to the present invention, it is possible to obtain the reflective type liquid crystal display device producing those effects mentioned above.

Discussed so far is a case where the anisotropic diffusing film 42 formed by subjecting liquid crystal molecules and photoreactive polymer to phase separation is used with no voltage applied thereto. The following will explain an example where good polarization preservation properties and diffusion characteristics can be made compatible by adopting as a liquid crystal layer a substance having an arrangement similar to that of the anisotropic diffusing film 42 and applying voltage.

Here will be explained improvement in quality of optical properties of a reflective type liquid crystal display device that uses a reflector plate having a good polarization preservation function for dark display and that exploits diffusion effects for bright display.

First, minimizing the display light component directed towards the observer is necessary for high contrast dark display, and therefore a reduced reflectance of the liquid crystal display device and good polarization preservation function of the reflector film are essential. Moreover, under normal observation conditions, the observer uses the liquid crystal display device, for example, in such a position to avoid mirror-surface reflection component from light sources to avoid the image of a light source on the ceiling reflected at the front surface of the display element. That position reduces the amount of the display light directed towards the observer and is suitable for dark display, if the reflector film forms mirror finished surface or a reflector surface having little diffusion characteristics (dispersion properties). This is how good dark display is effected in a positive combination with dark display effects produced by a reflector plate having good polarization preservation properties.

Meanwhile, in bright display, if the reflector film forms effective mirror surface and has weak diffusion effects, the liquid crystal display element per se, which has a high reflectance, is likely to reflect the surroundings thereon. Besides, the display surface of the liquid crystal reflects larger part of the light from light sources in a position preferred by the observer, i.e., in such a position to avoid the reflected image of a light source, less display light being directed towards the observer. It is therefore difficult to effect bright display and obtain good visibility.

However, if the reflection during bright display is not similar to the reflection by mirror surface, but has strong diffusion effects, the diffusion effects cause the reflection of surroundings to be less clear and displayed images to become more recognizable, effecting the so-called paper white display. Moreover, in the disposition to avoid reflection of light sources, a high percentage of the amount of display light is directed towards the observer in comparison to the case of the above reflector film having strong mirror surface, effecting brighter display and better visibility to the observer.

As explained above, an effectual way to effect bright display and good dark display is to control diffusion characteristics, as well as to control the reflectance by way of the liquid crystal.

Detailed explanations will be made by way of a typical arrangement of the liquid crystal layer in accordance with the present invention. Here will be explained a liquid crystal layer adopting, as a liquid crystal & polymer complex film, for example, a polymer-dispersed liquid crystal mode which exhibits a diffusion state with no voltage applied and a transparent state with voltage applied. A liquid crystal layer, employing the polymer-dispersed liquid crystal mode, in which the orientation of the liquid crystal is twisted by 40° to 50° as a result of subjecting the liquid crystal layer to orientation treatment such as rubbing, is formed from two substrates. Used as the liquid crystal & polymer complex film is, for example, so-called NCAP (Nematic Curvilinear Alinged Phase) in which tiny liquid crystal drops are dispersed in a polymer like capsules (U.S. Pat. No. 4,435,047). NCAP allows the transparent state and the diffusion state to be switched by switching the voltage. In addition, PN (Polymer Network) LC in which mesh-like structure of a polymer is formed in continuous liquid crystal layer is also preferred (Japan Display 1989, 690 –693).

Figure 13A:
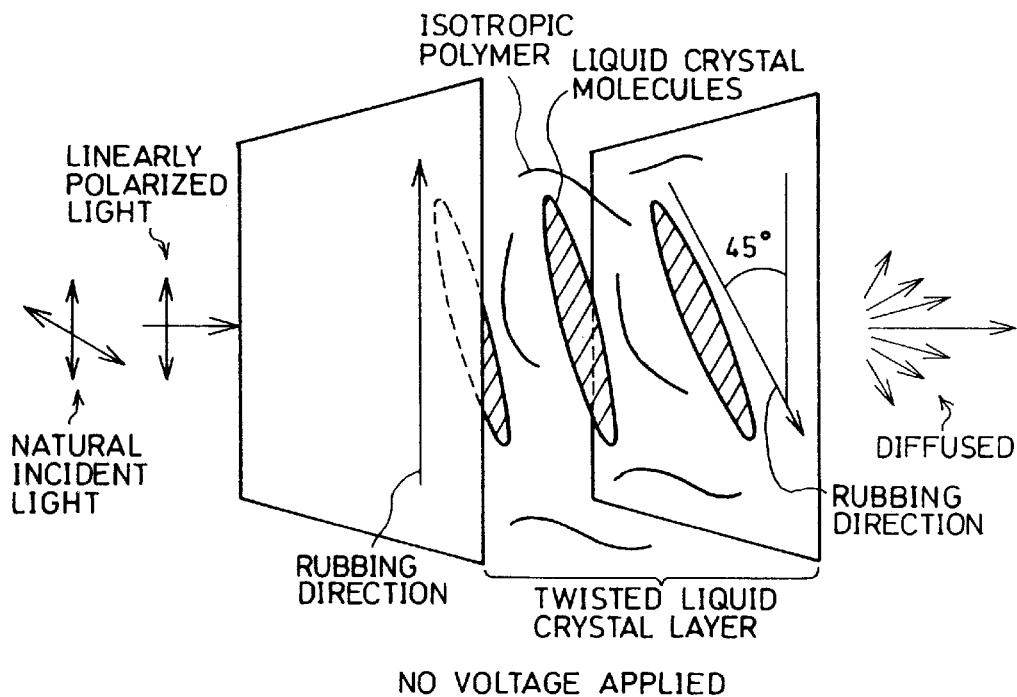
FIGS. 13(a) and 13(b) are explanatory drawings showing diffusion and passage control operations of a liquid crystal polymer complex film in a twisted diffusion mode in accordance with the present invention.

When such a twisted liquid crystal layer is adopted in a diffusion control type of a liquid crystal display mode, light travelling through the liquid crystal & polymer complex layer propagates while rotating the plane of polarized light, and is affected by the diffusion effects of the complex film as well. FIG. 13(a) schematically illustrates this phenomenon.

In other words, the liquid crystal molecules rotate the plane of polarized light like a normal TN type liquid crystal element, and the difference in the refraction index between the liquid crystal molecules and the polymer causes diffusion effects.

In the above example, when no voltage is applied, the liquid crystal & polymer complex layer is orientated with a twist angle, and the light having passed therethrough, while being diffused, rotates the polarization according to the liquid crystal molecule orientation and enters the quarter-wavelength plate. If the quarter-wavelength plate is disposed so that the main axis of the quarter-wavelength plate is directed towards the plane of the linearly polarized light entering the quarter-wavelength plate (Normally White disposition), white display is effected by bright display in combination with diffusion effects (see, for example, Japanese Laid-Open Patent Application No. 55-48733/1980 (Tokukaisho 55-48733)).

Figure 13B:
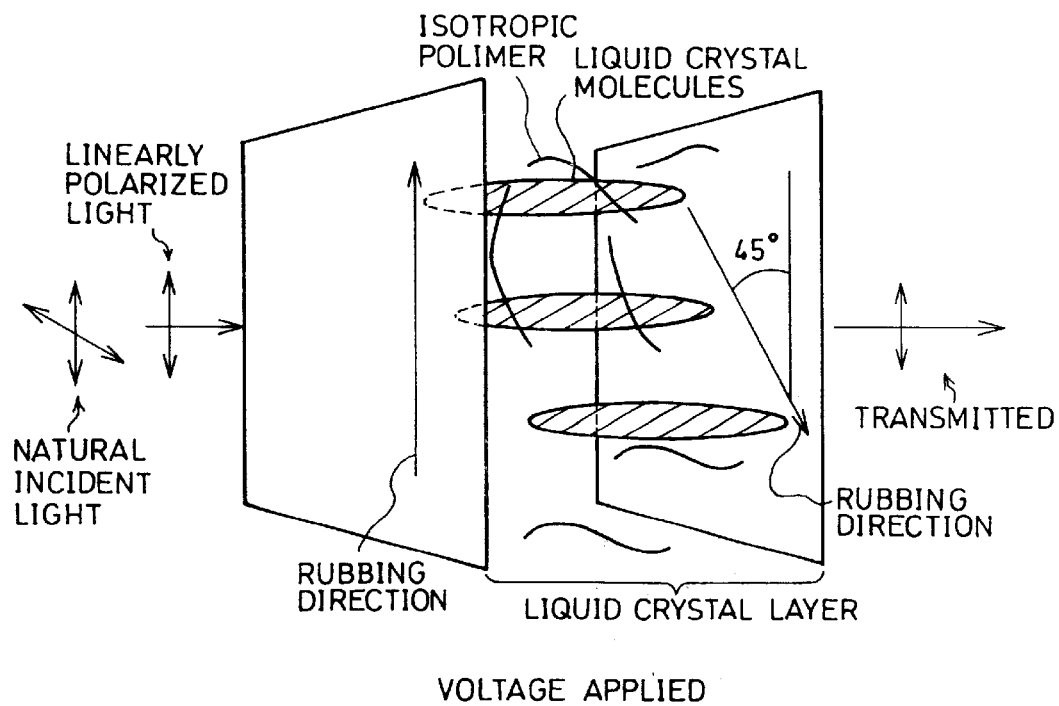

Meanwhile, when voltage is applied, the liquid crystal molecules are orientated perpendicular to a light-passing electrode and a reflector electrode, and the light that enters from the outside and then exits to the outside again reaches the quarter-wavelength plate, while maintaining the plane of polarized light at the passing direction of the polarizer plate on the light-entering side, and thereby passes the quarter-wavelength plate twice in total. Therefore, practically the phase difference adds to half the wavelength, and the plane of polarized light is rotated by 90°. Incident light is thereby absorbed before exiting, effecting dark display. Here, if the reflector film that forms effective mirror surface and has a good polarization preserving function is used, a good black state is effected. Besides, since there is only little diffusion effect by the liquid crystal & polymer complex film, incident light, if ever not absorbed by the polarizer plate, does not reach the observer. FIG. 13(b) schematically illustrates this phenomenon of light passing the liquid crystal segment. There is no difference in the refraction index between the liquid crystal molecules and the polymer, there occurs little diffusion effect. In the following, the mode according to which bright display is effected with a quarter-wavelength plate preventing the light diffused by a twisted liquid crystal & polymer complex layer from rotating the plane of polarized light will be referred to as a twisted diffusion mode.

The description below will explain a liquid crystal layer adopting, for example, a polymer-dispersed liquid crystal layer which exhibits a transparent state with no voltage applied and a diffusion state with voltage applied. This display mode will be referred to as the twisted transparent mode to distinguish it from the twisted diffusion mode.

Figure 14A:
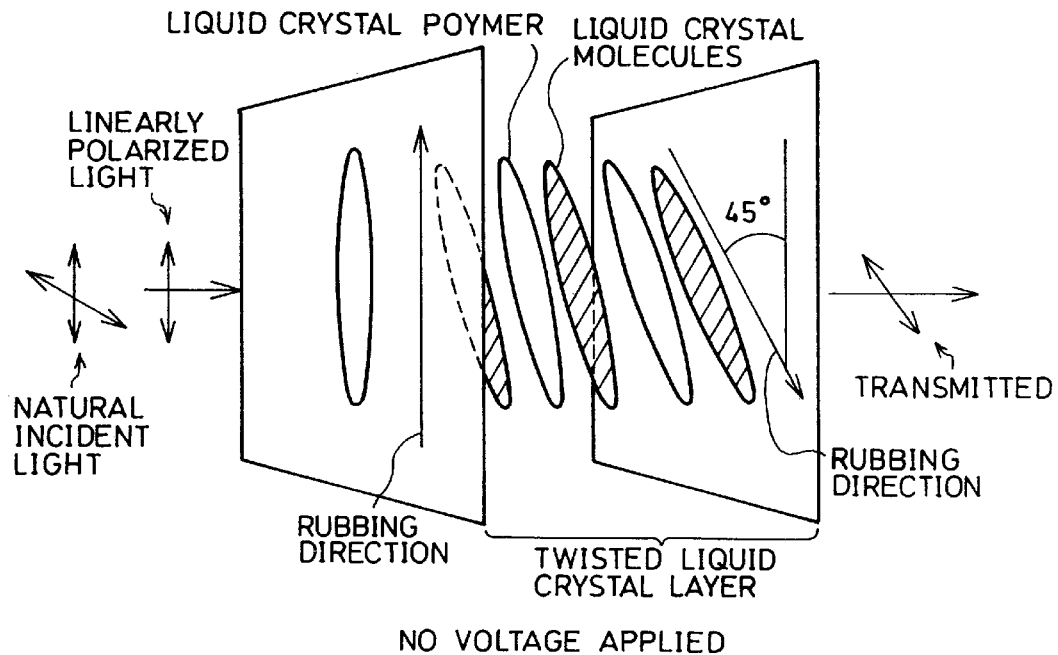
FIGS. 14(a) and 14(b) are explanatory drawings showing diffusion and passage control operations of a liquid crystal & polymer complex film in a twisted diffusion mode in accordance with the present invention.

When no voltage is applied, liquid crystal molecules and polymer in an orientated polymer-dispersed liquid crystal layer that is polymer-dispersed type liquid crystal having undergone orientation treatment is orientated with a twist angle, and the light passing therethrough is little affected by the diffusion effects, while rotating the polarization according to the twisted orientation. FIG. 14(a) schematically illustrates this phenomenon of light passing the liquid crystal layer. The following display control is effected by the combination of the above complex film and a quarter-wavelength plate disposed so that the main axis thereof is at 45° to the plane of the linearly polarized light entering the quarter-wavelength plate (Normally Black disposition). When no voltage is applied, the phase difference adds to half the wavelength in total, similarly to the twisted diffusion mode with voltage applied. This effect of the wavelength plate enables the linearly polarized light that crosses with the direction thereof upon entering at a right angle to pass through the liquid crystal & polymer complex film and to be absorbed by a polarizer upon exiting, effecting dark display. In other words, although the liquid crystal rotates the plane of polarized light like a TN type liquid crystal element, since there is no difference in diffraction indices between the liquid crystal molecules and the polymer, there occur no diffusion effects.

Figure 14B:
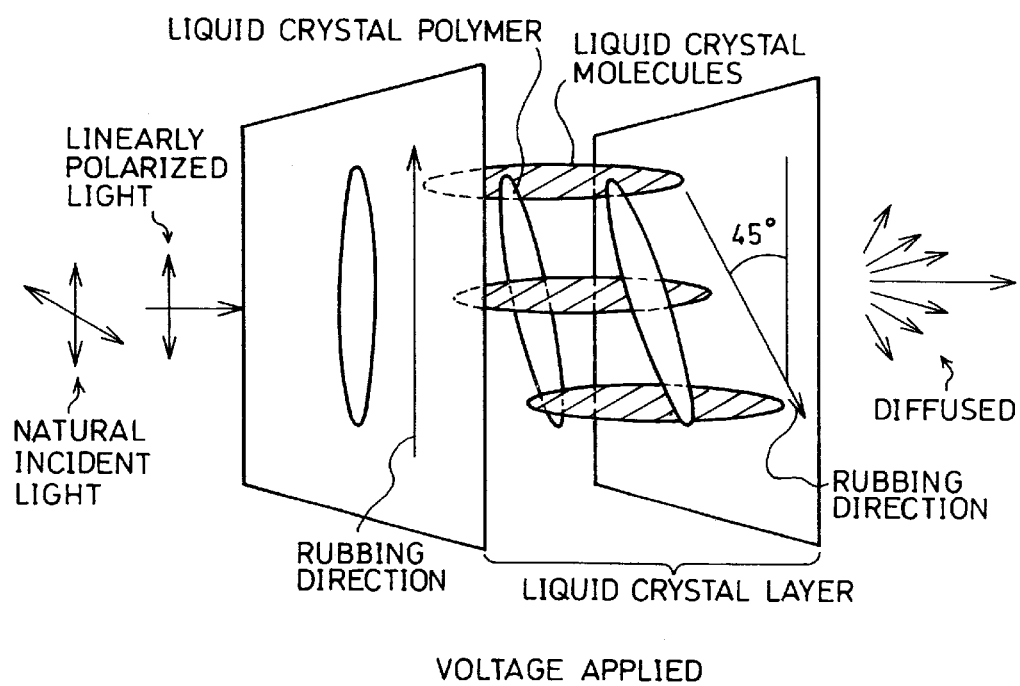

When voltage is applied, there occur diffusion effects, and the plane of polarized light is not rotated. If the quarter-wavelength plate is disposed in the above manner, light linearly polarized in the direction of the main axis of the quarter-wavelength plate enters, and bright display is effected without causing changes in the polarization state because of the presence of the quarter-wavelength plate. Similarly to bright display by the twisted diffusion mode, white display is effected by the state of high transmittance in combination with the diffusion effects. FIG. 14(b) schematically illustrates this phenomenon of light travelling through the layer. In other words, since the liquid crystal molecules are upright to the substrates, the plane of the polarized light passing through the liquid crystal layer is not rotated, and there occur diffusion effects due to the difference in the refractive index between the liquid crystal molecules and the polymer.

An example of liquid crystal & polymer complex films suitable for the twisted transparent mode is a polymer-dispersed type liquid crystal complex film produced by subjecting to polymerization phase separation the mixture of an organic material that exhibits liquid crystal phase in a low molecule state and that preserves the optical anisotropy thereof even if polymerized to be a polymer with a liquid crystal material that is not polymerized.

A reflective type liquid crystal display device using the above liquid crystal phase will be explained in more detail in the following by way of embodiments, which is, by no means, meant to restrict the scope of the invention.

The following will explain an embodiment of the twisted diffusion mode illustrated in FIG. 13 (the fifth embodiment). FIG. 15 is a cross-sectional view of a reflective type liquid crystal display device of the fifth embodiment in accordance with the present invention (hereinafter, will be referred to as the liquid crystal display device). The liquid crystal display device 1 includes a pair of transparent glass substrates 2 and 3. On the glass substrate 2 is formed a metal reflector film 7 made of metal material, such as aluminum, nickel, chromium, or silver, to constitute a reflector plate 8 that is a light reflector member. A quarter-wavelength plate 5 is formed on the metal reflector film 7, and an orientation film 9 is formed thereon.

On the surface of the glass substrate 3 opposite the glass substrate 2 is formed a transparent electrode 10 made of, for example, ITO (Indium Tin Oxide). Voltage is applied across the liquid crystal layer by the metal reflector film 7 and the transparent electrode 10. Besides, on the display side of the glass substrate 3 is disposed a polarizer plate 4. An orientation film 11 is formed by coating the glass substrate 3 on which the transparent electrode 10 has been formed. The circumferential edges of the mutually opposing glass substrates 2 and 3 are sealed with a sealing material 12 (detailed later). The segment between the orientation films 9 and 11 receives rubbing treatment to have 45°-twisted orientation.

The metal reflector film 7 is formed by, for example, sputtering or vapor deposition method of a metal material, such as Al or Ag, that has a high reflectance and a low resistance. However, in order not to have a polarization cancelling property, the surface of the metal reflector film 7 needs to form mirror surface by controlling the film-forming temperature, the film forming rate, etc. In addition, the thickness needs to be specified in a range that provides a substantial reflectance and resistance, preferably in a range of about 0.2 μm to 2 μm. The metal reflector film 7 may have flat mirror surface, or alternatively be a diffusing mirror having smooth convexities and concavities.

A liquid crystal material such as PNM-106 (product name; made by Dainippon Ink, Inc.) is injected into the liquid crystal layer 13 as a polymer-diffused type liquid crystal material having a positive dielectric anisotropy $\Delta\in$. A chiral agent is prepared in accordance with the setting of the twist angle. The liquid crystal layer is adjusted to be twisted by 45° across the upper and lower sides thereof, injected in vacuum, sealed, irradiated with ultraviolet light, and subjected to phase separation of polymer and liquid crystal. As a result, the liquid crystal molecules are orientated with a twist angle of 45°. The members composing the glass substrate 2 may be of the same materials as those for the glass substrate 3, but not necessarily transparent.

The polymer-dispersed liquid crystal layer 13 only needs to be liquid crystal 14 dispersed and hold in a solid segment 15 made of a polymer (hereinafter, will be referred to as a polymer matrix): some examples are mutually separate liquid bubbles of liquid crystal sealed like microcapsules (NCAP) and those liquid bubbles connected (PNLC). Alternatively, the polymer-dispersed liquid crystal layer 13 may be a polymer matrix crosslinked like gel or a polymer matrix having a large number of tiny openings filled with liquid crystal. Since the twisted diffusion mode is adopted, the polymer matrix 15 preferably does not have birefringence: e.g., epoxy resins and acrylic resins. The boundary between the liquid crystal 14 and the polymer matrix 15 is omitted in the drawings.

Used as the liquid crystal 14 is a cyanobiphenyl, phenyl cyclohexane, or other liquid crystal generally adopted for TN and STN types and having a positive dielectric anisotropy. The content ratio of the liquid crystal molecules and the polymer in the polymer-dispersed liquid crystal layer 13 is preferably specified in such a range that the liquid crystal accounts for 50 weight % to 98 weight W.

If the content ratio of the liquid crystal is low, the difference in the refractive index between the polymer and the liquid crystal to ordinary light is preferably within 0.04, and more preferably within 0.02, so as to increase transparency when voltage is applied. If the content ratio of the liquid crystal is sufficiently high, such an attention is not required.

Moreover, the light diffusion characteristics of the liquid crystal are preferably high so as to prevent reflections of the face of the observer or surroundings from appearing on the display surface and to lower the operational voltage. For these purposes the birefringence index of the liquid crystal is preferably not less than 0.1, and more preferably not less than 0.15.

The polymer-dispersed liquid crystal layer 13 may be manufactured by mixing a polymer matrix material and liquid crystal in advance and then causing phase separation either by thermal polymerization (see Japanese Laid-Open Patent Application No. 63-501512/1988 (Tokukaisho 63-501512) or by ultraviolet light polymerization (see Japanese Laid-Open Patent Application No. 1-198725/1989 (Tokukaihei 1-198725).

An example of the method of obtaining a polymer-dispersed liquid crystal layer 13 having a uniform thickness is to prepare a mixed liquid of a polymer matrix material and liquid crystal, and then cure by spreading on an electrode substrate. Another example is to, like a conventional TN type liquid crystal display device, seal the circumferential edges of an electrode substrate with a sealant, inject a mixed liquid of a polymer matrix material and liquid crystal thorough an injection port, and cure by heat or ultraviolet light. Needless to say, the size of the diffusion unit of the liquid crystal drops and mesh-like polymer need to be appropriately controlled.

UV curable liquid crystal, for examples, may be used as the quarter-wavelength plate 5. Since the visibility is the best when the wavelength is 530 nm to 550 nm, the retardation of the quarter-wavelength plate 5 in the present embodiment is preferably specified to be 133 nm to 138 nm; however, the retardation is appropriately adjusted depending on the wavelength dispersion of the refractive index anisotropy that is unique to the material used. In the present embodiment, the slow axis of the quarter-wavelength plate 5 and the polarization axis of the polarizer plate 4 are disposed so that the slow axis makes 45° with the polarization axis, in order to produce the display device of the twisted diffusion mode.

More preferably, a layer may be provided for compensating for the displacement of the polarization state at each wavelength before producing the 130 nm phase difference, so as to satisfy quarter-wavelength conditions not only around 550 nm at which the visibility is good, but also in a wider range of the wavelength spectrum. It has been found out that the birefringence amount of the compensator plate is best made to satisfy half-wavelength conditions, and that if the axes of the quarter-wavelength plate and the compensation half-wavelength plate are specified to form an angle of 60° to 120°, the compensation is performed best. In such an event, the quarter-wavelength plate has a retardation of 120 nm to 150 nm to the light entering perpendicularly, the compensation half-wavelength plate is disposed to flank the quarter-wavelength plate with the reflection surfaces thereof, the compensation half-wavelength plate has double the retardation of the quarter-wavelength plate, and the in-plane slow axes of the two plates differ from each other in direction by 60° to 120°. Needless to say, a phase difference film satisfying the quarter-wavelength condition in a wider band formed as above than usual may be used instead of the quarter-wavelength plate 5, and that the direction corresponding to the optic axis of the quarter-wavelength plate in this case only needs to be the direction that transforms linearly polarized light into circularly polarized light.

The metal reflector film 7 is preferably formed on one of the surfaces, of the substrate 2, facing the polymer-dispersed liquid crystal layer 13 to eliminate the affection from viewing angle difference. In such a case, the quarter-wavelength plate 5 is also disposed on that surface, of the glass substrate 2, facing the polymer-dispersed liquid crystal layer 13 as shown in FIG. 13.

The polarizer plate 4 having a pure substance transmittance of, for example, 48% is disposed on one of the surfaces, of the glass substrate 3, not facing the liquid crystal layer 13.

Figure 16:
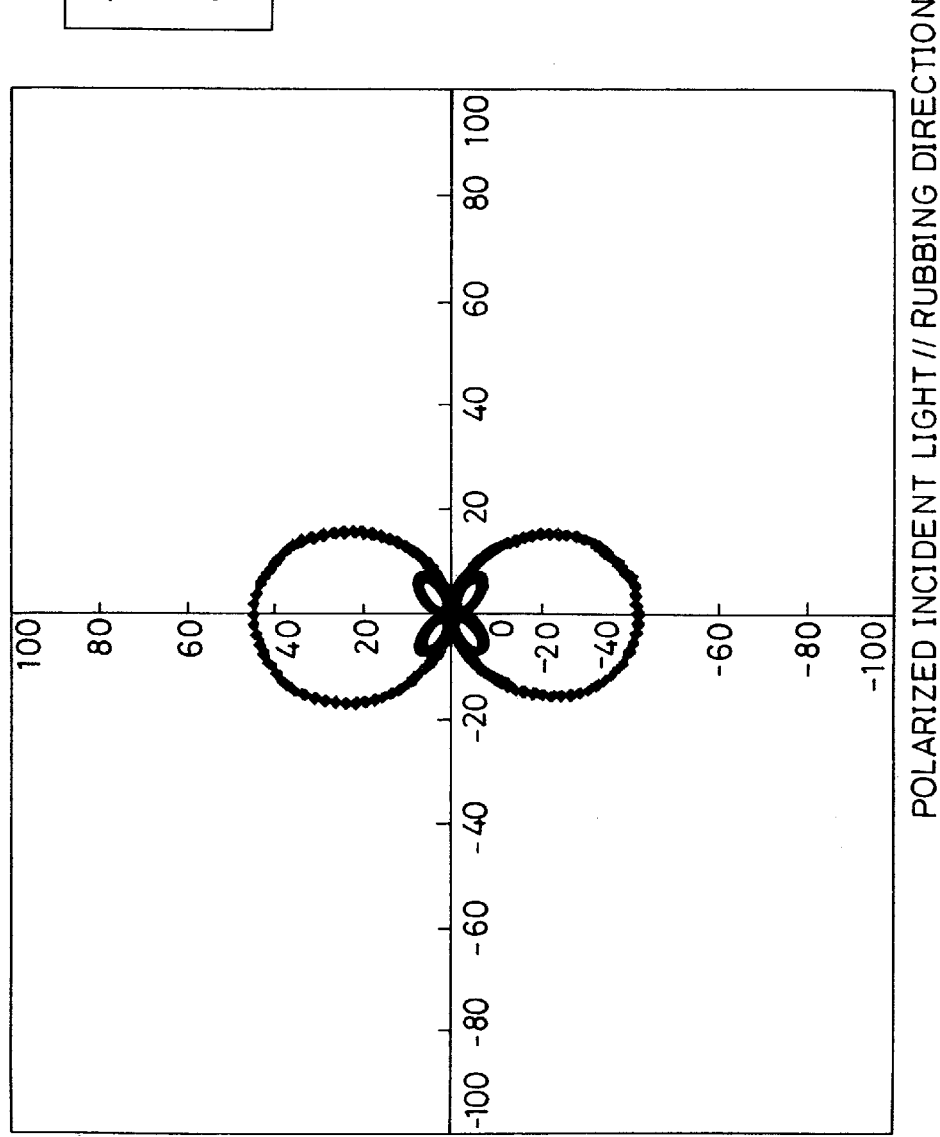
FIG. 16 is an explanatory drawing showing an example of results of measurement for passing and diffusing characteristics of the liquid crystal & polymer complex film of the embodiment illustrated in FIG. 15.
Figure 17A:
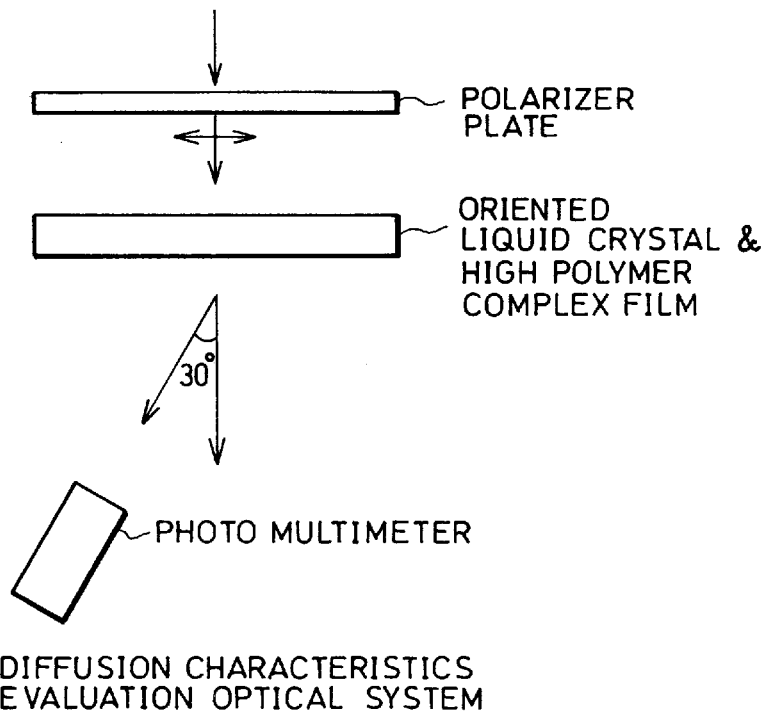
FIGS. 17(a) and 17(b) are drawings showing optical arrangements for the measurement and evaluation shown in FIG. 16.
Figure 17B:
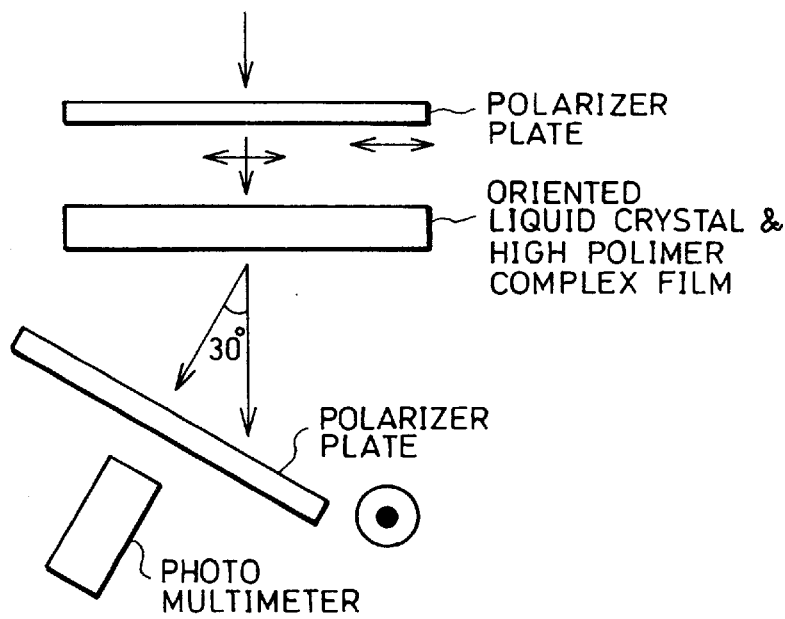

With the above arrangement, when no voltage is applied, the liquid crystal 14 of the polymer-dispersed liquid crystal layer 13 is orientated with a twist angle of 45°. The light passing therethrough is diffused, but the polarization characteristics of the diffused light is preserved. Therefore, most of the diffused light can pass through the polarizer plate 4, effecting so-called bright display with the device. In bright display, since the polymer-dispersed liquid crystal layer 13 is in a white diffusion state, even if the surface, of the metal reflector film 7, which is in contact with the liquid crystal layer 13 is mirror surface, it is not likely that the reflections of surroundings appear on the screen. The visibility is therefore little degraded. The inventors of the present invention have diligently worked and found out that the diffused light substantially preserves the polarization characteristics as shown in FIG. 16. FIG. 16 shows results of measurement for the strength of diffused light for every rotation angle of a liquid crystal cell being rotated in a plane in the arrangement shown in FIG. 17(*a*), and measurement of that diffused light being received by a crossed-Nicols polarizer plate 4 as shown in FIG. 17(*b*). FIG. 16 is an explanatory drawing showing the polarization dependency of the light diffused by the liquid crystal cell fabricated in the above process with parallel liquid crystal orientation for convenience.

Figure 18:
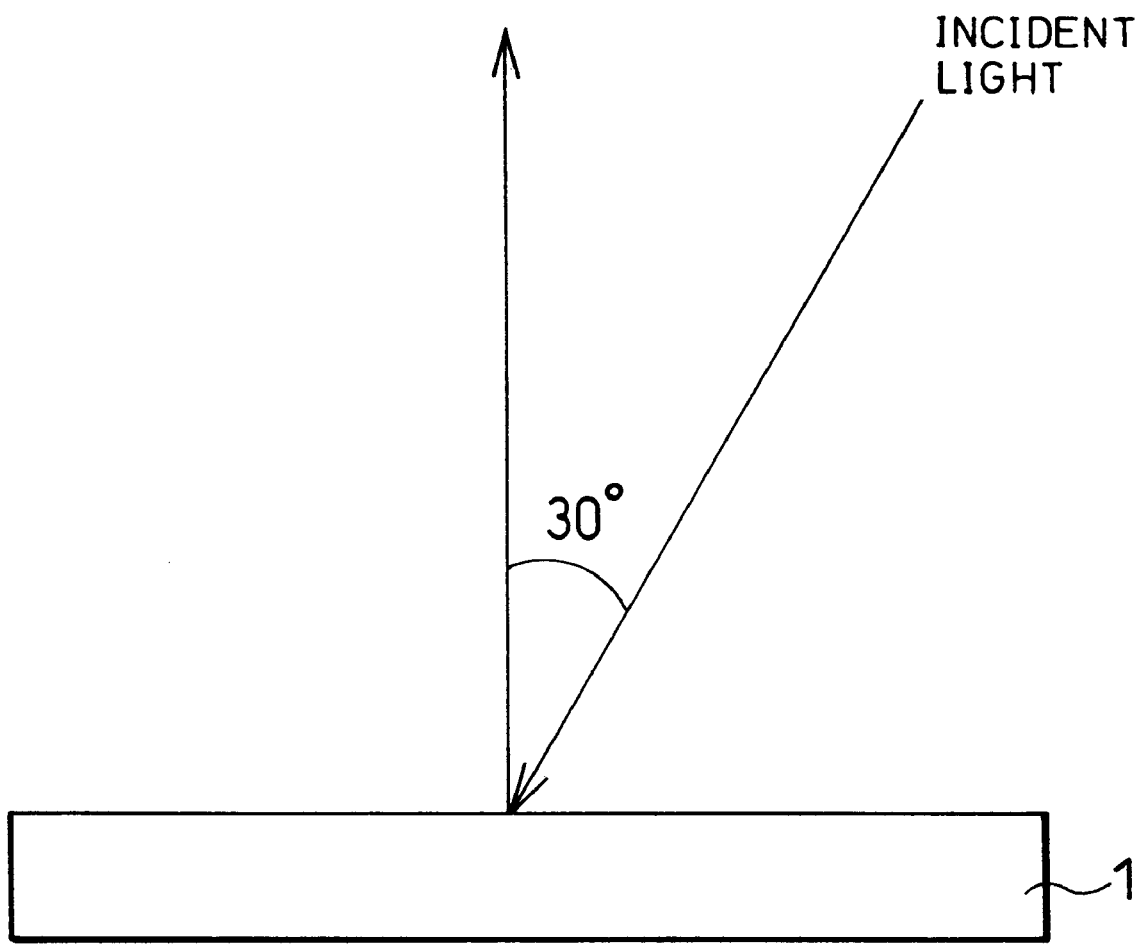
FIG. 18 is an explanatory drawing showing a method of measurement for reflection properties of the liquid crystal & polymer complex film of FIG. 15.

Since as shown in FIG. 16, only the polarized component of the incident light in the orientation direction of the liquid crystal is diffused, and the diffused light preserves polarization, the diffused light is absorbed by the light-receiving polarizer plate 4 in crossed-Nicols light reception. In addition, when the orientation of liquid crystal is different from the both polarizer plates, for example, by 45° in the disposition of a crossed-Nicols polarizer plate, the polarized light coincides with the orientation direction of the liquid crystal as a result of the diffusion effects of the liquid crystal. Moreover, since the light is received by a light-receiving polarizer plate of which the polarization component is different by 45°, the strength is greatest in crossed-Nicols light reception, being approximately quarter the peak strength of non-polarized light reception. It is confirmed that those characteristics remain the same even if the orientation of the liquid crystal is twisted by 45°. It is confirmed that therefore there occurs no loss in the light amount except that the light is absorbed by the polarizer plate upon entering, and that if the strength of the diffused light of the liquid crystal display device of the present embodiment is measured in the disposition shown in FIG. 18, the change is only 10% depending upon the existence and non-existence of a polarizer plate on the device.

Meanwhile, when voltage is applied, since the liquid crystal 14 is orientated perpendicularly to the metal reflector film 7 and the transparent electrode 10, birefringence effects do not occur to the perpendicular incident light. Therefore, the polarized state changes only due to the quarter-wavelength plate 5. Incident light from the outside is reflected by the metal reflector film 7, passes through the quarter-wavelength plate 5 and the polarizer plate 4, and exits to the outside again. However, since the incident light passes through the quarter-wavelength plate 5 twice during the time from entering the device to exiting the device, the phase change which actually takes place equals half the wavelength. Therefore, the plane of polarized light is rotated by 90°, and the light is absorbed by the polarizer plate 4 when exiting, rendering the display state of the device so-called dark display. In this case, no diffusion effects occur with voltage applied, enabling black display free from diffusion.

Figure 19:
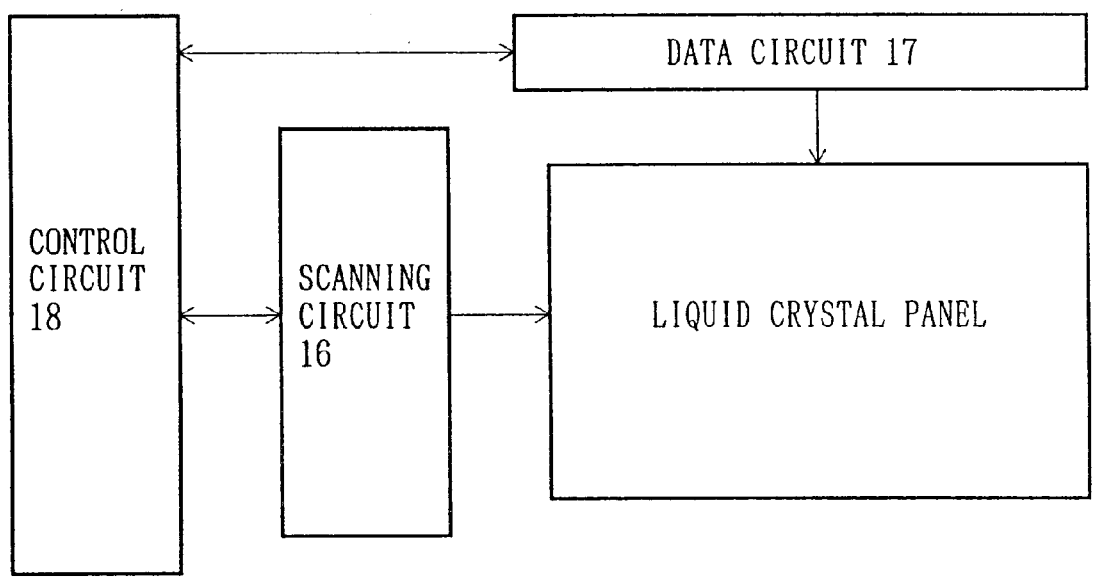
FIG. 19 a schematic diagram showing an arrangement of a circuit for driving the liquid crystal display device shown in FIG. 15.

As shown in FIG. 19, the metal reflector film 7 and the transparent electrode 10 are connected respectively to a scanning circuit 16 and a data circuit 17. The scanning circuit 16 and the data circuit 17, being controlled by a control circuit 18 such as a microprocessor, applies display voltage or non-display voltage supplied by a voltage generating circuit (not shown) to realize display, while scanning the metal reflector film 7 and the transparent electrode 10 on the basis of the display data in accordance with displayed contents.

FIG. 20(*a*) shows optical arrangement of the polarizer plate 4, the polymer-dispersed liquid crystal layer 13 and the quarter-wavelength plate 5. The clockwise angle θ1 of the direction L2 of the slow axis of the quarter-wavelength plate 5 is specified to be, for example, 45° with respect to the direction L1 of the absorption axis or transparent axis of the polarizer plate 4. Meanwhile, the anti-clockwise angle θ2 (not shown) of the orientation L3 on the side in contact with the substrate 3, i.e. one of the orientation directions of the liquid crystal molecules of the polymer-dispersed liquid crystal layer 13 shown in FIG. 15, is specified to be, for example, 0° with respect to the direction L1.

Next, the following description will explain manufacturing process of the present embodiment. A polyimide resin film is formed on the respective glass substrates 2 and 3 and baked at 200° for an hour. For example, SE 150 (available from Nissan Chemical Industries, Ltd.), which orientates liquid crystal parallel to the substrate, is used. The orientation films 9 and 11 are formed in this manner. Thereafter, rubbing treatment is carried out to orientate the liquid crystal molecules of the polymer-dispersed liquid crystal layer 13.

Meanwhile, aluminum 2000 Å as the metal reflector film 7 is formed in advance on the glass substrate 2, and the quarter-wavelength plate 5 is formed thereafter. The quarter-wavelength plate 5 is formed by the method of forming the same polyimide resin film (not shown) on the metal reflector film 7 on the glass substrate 2 as that on the glass substrate 3, baking, and carrying out rubbing treatment. The rubbing direction is base treatment for forming a slow axis of the quarter-wavelength plate 5 in the direction L2. After that treatment, UV curable liquid crystal undergoes the process of application, heating, orientation treatment, and ultraviolet light exposure polymerization curing, so as to form the quarter-wavelength plate 5. A polyimide resin film is formed on the quarter-wavelength plate 5 which is polymerized and cured, and baked, so as to form the orientation film 9. Moreover, the orientation film 9 is combined with the orientation film 11 formed on the glass substrate 3 by rubbing treatment, so as to determine the orientation of the polymer-dispersed liquid crystal layer 13. Here, the rubbing direction is determined to realize the twist angle of 45° between the substrates 2 and 3. The sealing material 12 for sealing the glass substrates 2 and 3 is formed by screen-printing or dispenser-coating an epoxy adhesive sealing agent mixed with spacers having a diameter of, for example, 11 μm.

When the reflector plate 8 formed in this manner is combined with the glass substrate 3 on which the transparent electrode 10 and the orientation film 11 are formed, spacers having a diameter of 10 μm are sprayed between the glass substrates 2 and 3 to control the thickness of the liquid crystal layer. The cell is fabricated by combining the glass substrates 2 and 3, using the sealing material 12, so as to face each other, and then curing the sealing material 12. Then liquid crystal & polymer precursor mixture composing the liquid crystal layer 13 is injected with vacuum injection method. After the injection, the surface of the glass substrate 3 is irradiated with ultraviolet light radiating from a high voltage mercury-arc lamp. The orientated polymer-dispersed type liquid crystal is produced in this manner.

Figure 21:
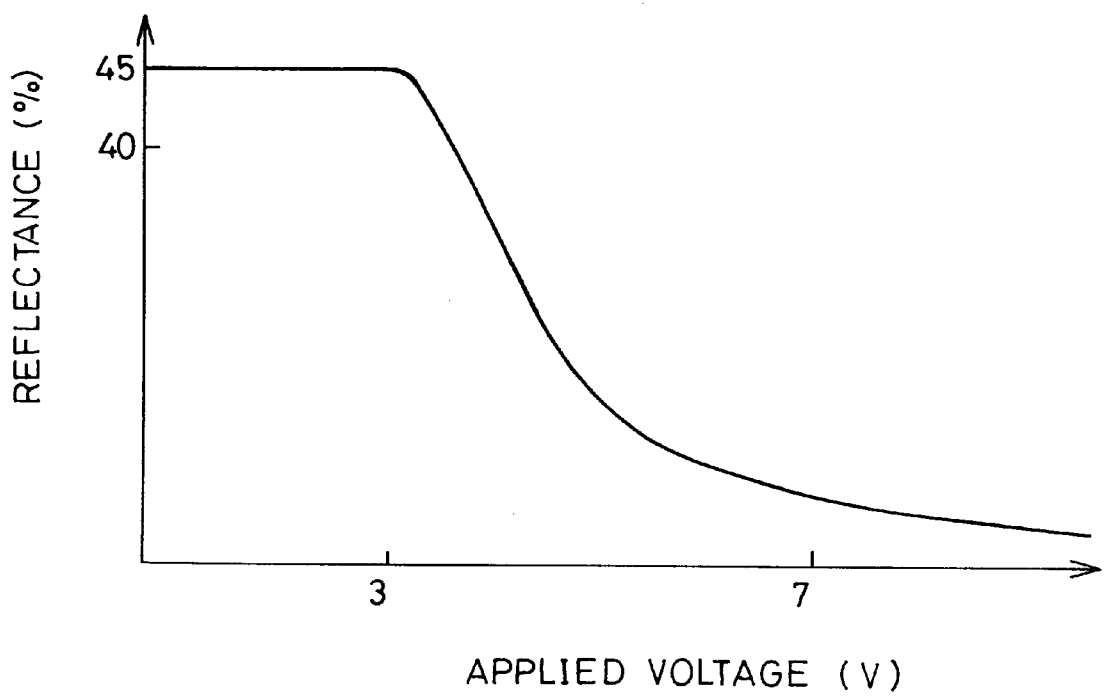
FIG. 21 is a characteristics drawing showing the applied voltage versus the reflectance property of the liquid crystal display device shown in FIG. 15.

FIG. 21 is a graph showing the applied voltage versus reflectance characteristic of the liquid crystal display device 1 of the present embodiment. In the present embodiment, when voltage is applied, the reflectance, in the direction normal to the liquid crystal display device 1, of the incident light at an angle of 30° with respect to the that normal direction is 45% at maximum, and the largest contrast ratio is 7. A standard white board of Magnesium oxide MgO is used as a member acting as the reference for determining the reflectance.

Figure 22:
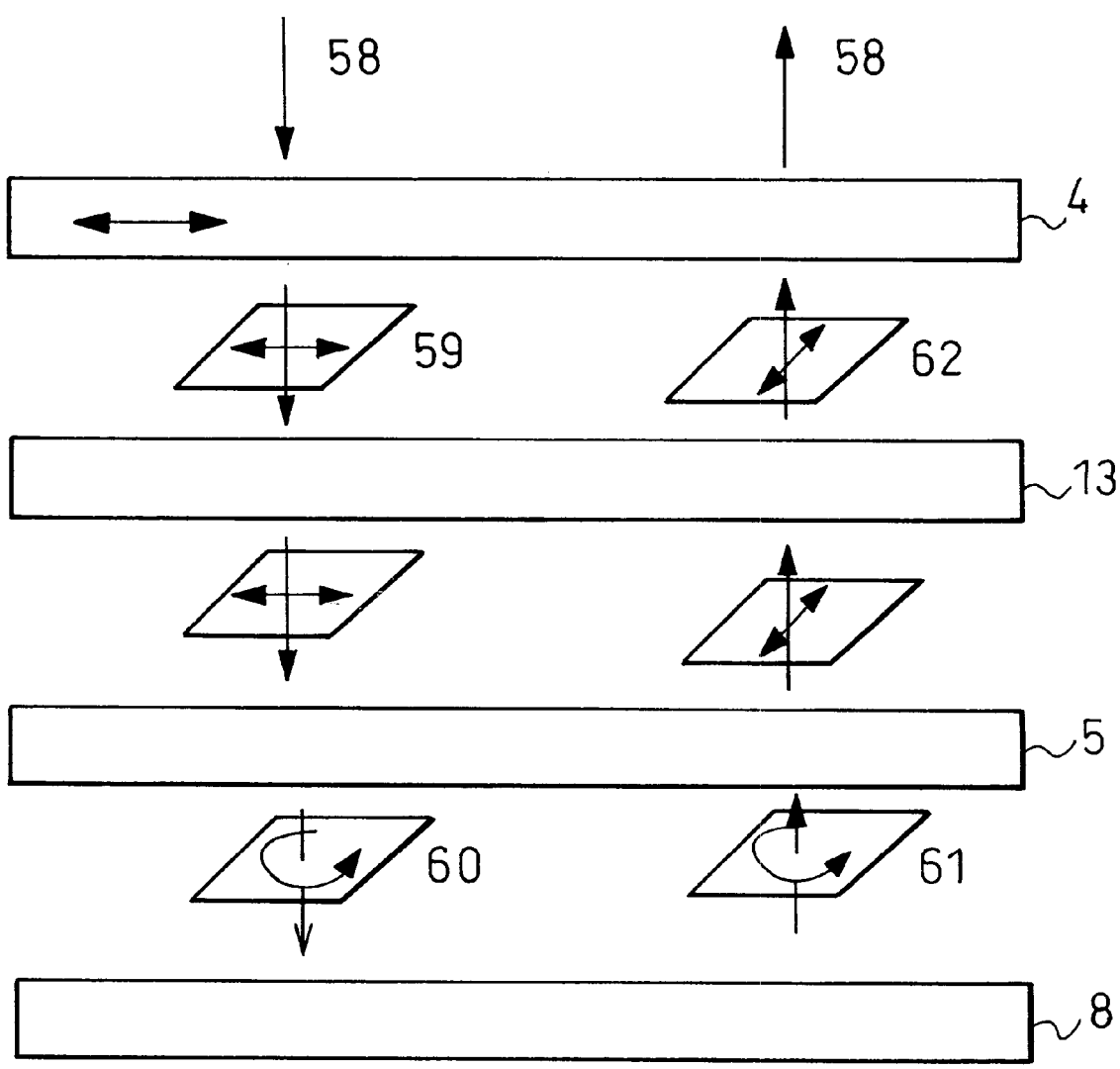
FIG. 22 is an explanatory drawing showing display during a light-blocking operation by the liquid crystal display device shown in FIG. 15.
Figure 23:
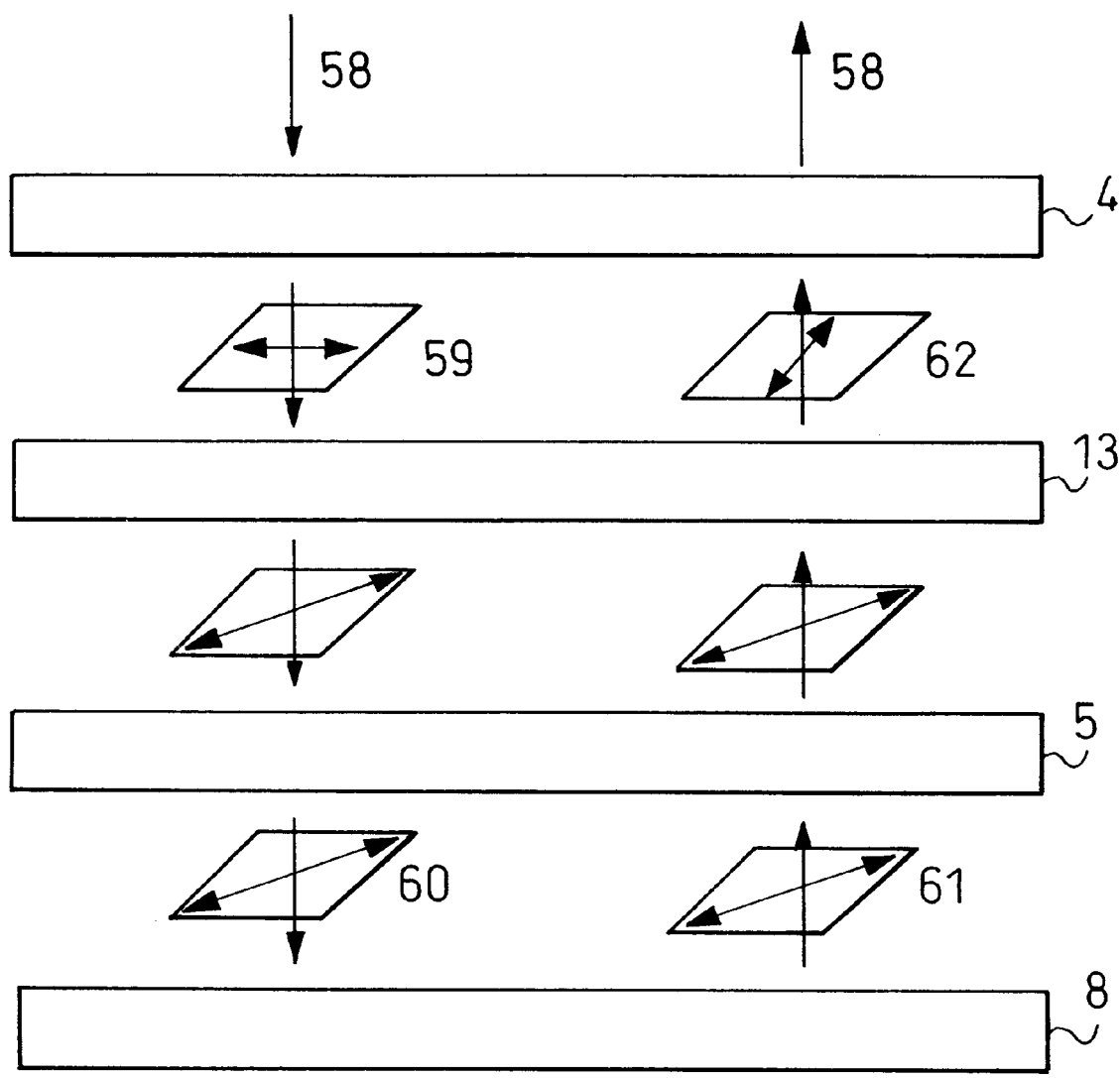
FIG. 23 is an explanatory drawing showing display during a light-passing operation by the liquid crystal display device shown in FIG. 15.

FIGS. 22 and 23 illustrate the operations of the liquid crystal display device 1 of the present embodiment. For convenience in explanation, the liquid crystal display device 1 is shown decomposed. During the light-blocking operation shown in FIG. 22, incident light 58, as passing through the polarizer plate 4, becomes linearly polarized light 59 parallel to the direction L1 of the polarizer plate 4. The linearly polarized light 59 passes through the liquid crystal layer 13, enters the quarter-wavelength plate 5 as the linearly polarized light without being transformed at all, and becomes, for example, clockwise circularly polarized light 60. The circularly polarized light 60 is reflected by the reflector plate 8 and becomes anti-clockwise circularly polarized light 61. The anti-clockwise circularly polarized light 61, as passing through the quarter-wavelength plate 5 and then the liquid crystal & polymer complex layer 13, becomes linearly polarized light 62 having a plane of polarized light by a direction perpendicular to the direction of the linearly polarized light 59 upon entering. The linearly polarized light 62 is blocked by the polarizer plate 4. In other words, the reflected light from the reflector plate 8 is blocked. In this case, since the orientated polymer-dispersed type liquid crystal does not diffuse light, achieving good black display free from diffusion effects. As another example, when the linearly polarized light 59 passes through the quarter-wavelength plate 5 and becomes, for example, anti-clockwise circularly polarized light, the circularly polarized light is reflected by the reflector plate 8 and becomes clockwise circularly polarized light.

Meanwhile, during the light passing operation shown in FIG. 23, as the incident light 58, passing through the polarizer plate 4, becomes the linearly polarized light 59 parallel to the direction L1. The linearly polarized light 59 passes through the liquid crystal layer 13 and has a plane of polarized light rotated, for example, anti-clockwise by 45° in accordance with the direction in orientation treatment performed on the orientation films 9 and 11. The linearly polarized light 59, having passed the liquid crystal layer 13, passes through the quarter-wavelength plate 5, while preserving the original polarization state even after passing the quarter-wavelength plate 5. The linearly polarized light 59 is then reflected by the reflector plate 8, and passes the quarter-wavelength plate 5 again while still preserving the original polarization state. The linearly polarized light 59, as passing through the liquid crystal layer 13, rotates in the opposite direction to that upon entering, becomes linearly polarized light in the passing direction of the polarizer plate 4, passes through the polarizer plate 4, and exits. In this case, since the polarized light that coincides with the orientation direction upon passing through the orientated polymer-dispersed type liquid crystal is diffused, and passes while rotating the plane of polarized light in accordance with the twist of the orientation of the liquid crystal, bright diffused light exits from the polarizer plate, and a good white state can be achieved even with a reflector film having mirror surface used as the reflector film.

In this manner, a method is successfully established for the effects of diffusion to effectively vary the reflection transmittance modulation width that is obtained by a conventional polarizer plate, liquid crystal, and a quarter-wavelength plate for a larger value.

Note that in the present embodiment, the quarter-wavelength plate 5 needs to be formed between the polymer-dispersed liquid crystal layer 13 and the reflector plate 8, and the reflector plate 8 is formed on one of the surfaces, of the substrate 2, facing the polymer-dispersed liquid crystal layer 13. Although UV curable liquid crystal is used in the present embodiment, the quarter-wavelength plate of the present embodiment is not limited to this. For example, an extended film such as extended PVA (polyvinyl alcohol) or polymethyl methacrylate (PMMA) made of polycarbonate may be also used. In this case, it is necessary not only to dispose the film on the side of the substrate 2, that is not in contact with the liquid crystal, and to impart transparency to the substrate 2, but also to make the light-passing substrate 2 as thin as 0.1 mm to 0.7 mm and to reduce the visibility difference caused by the viewing angle.

Since the reflective type liquid crystal display device 1 of the present embodiment is arranged so that the surface forming the metal reflector film 7 of the reflector plate 8 is disposed on the side facing the polymer-dispersed liquid crystal layer 13, the visibility difference in observing the liquid crystal display device 1 is eliminated, and good images are displayed. Moreover, it is confirmed that good display quality is achieved as mentioned above, when the liquid crystal display device 1 is arranged to be driven with an active-matrix method, and such a reflector film is used as a pixel electrode connected to, for example, a thin film transistor or a non-linear element having MIM (Metal-Insulator-Metal) construction used as a switching element.

Furthermore, when the metal reflector film 7 is used as an electrode, the polymer-dispersed liquid crystal layer 13 and the quarter-wavelength plate 5 are disposed between the metal reflector film 7 and the transparent electrode 11 as in the present embodiment, resulting in an increase in drive voltage, an after-image due to electron attracted, etc. These problems can be effectively solved by providing transparent electrodes (not shown) between the polymer-dispersed liquid crystal layer 13 and the quarter-wavelength plate 5 and using the transparent electrode and the metal reflector film 7 for driving.

Next, the following description will explain an embodiment (sixth embodiment) using polymer-dispersed type liquid crystal, composed of E 44 (available from Merck Inc.) as p-type nematic liquid crystal and RDN-94207 (available from Rodick Inc.) as n-type nematic liquid crystal, and also using UV curable liquid crystal as a polymer matrix material mixed therewith. UV curable liquid crystal exhibits liquid crystal phase at room temperature, becomes orientated in the same manner as does ordinary liquid crystal material, is polymerized and cured by irradiation of ultraviolet light while preserving the arrangement of the liquid crystal molecules, and, even after being cured, still preserves the same birefringence as in liquid crystal phase. Hereinafter, the liquid crystal will be referred to as orientated polymer-dispersed liquid crystal so as to be distinguished over the liquid crystal of the fifth embodiment.

For the case of p-type nematic liquid crystal, SE 150 (available from Nissan Chemical Industries, Ltd.), which orientates the liquid crystal parallel to the substrate, is used as the orientation film. For the case of n-type nematic liquid crystal, JALS 204 (available from Japan Synthetic Rubber Ltd.), which orientates the liquid crystal perpendicular to the substrate, is used as the orientation film.

The liquid crystal and the UV curable liquid crystal are mixed at a weight ratio of 85:15. The mixture is injected in vacuum into a cell of a 10 micron thickness, irradiated with ultraviolet light of a 15 mW/cm² intensity for 500 seconds, and subjected to phase separation, so as to fabricate orientated polymer-dispersed type liquid crystal. Table 1 shows a result of visual observation with no voltage being applied, and a result, for comparison, using a polymer material with which normal birefringence does not occur.

TABLE 1

| Polymer resin | Diffusion observed |
| UV curable liquid crystal | No diffusion observed |

For the case of, for example, the p-type nematic liquid crystal being used, as shown in Table 1, diffusion effects are observed even with liquid crystal orientated parallel to a substrate holding a polymer complex layer due to a mismatch of the polymer and the refraction index of the liquid crystal. By contrast, diffusion is not observed with the UV curable liquid crystal, while diffusion is observed with voltage applied due to the orientation of the liquid crystal parallel to the electric field.

FIG. 14 illustrates such effects for the case of p-type liquid crystal. Since in a state where no voltage is applied, liquid crystal drops are optically equivalent to a liquid crystalline polymer matrix made of UV curable liquid crystal, light propagates as if the entire complex layer is composed of liquid crystal layer single phase. Meanwhile, diffusion effects occur in a state where voltage is applied.

Therefore, a complex system containing the UV curable liquid crystal and the p-type liquid crystal in accordance with the principle of the present invention of exploiting diffusion effects for bright display and restraining diffusion during dark display is "normally black arrangement", that is, an arrangement for effecting black display by varying the polarization state with a quarter-wavelength plate when liquid crystal is orientated in a direction parallel to the substrate and light passing through the complex layer produces rotation of the 45° twisted plane of polarized light. FIG. 20(b) shows such an example. The clockwise angle θ1 (not shown) of the direction L2 of the slow axis of the quarter-wavelength plate is specified to be, for example, 0° with respect to the direction L1 of the absorption or transparent axis of the polarizer plate. Meanwhile, the anti-clockwise angle θ2 (not shown) of the orientation L3 on the side in contact with the glass substrate 3, i.e. one of the orientation directions of the liquid crystal molecules of the orientated polymer-dispersed liquid crystal layer 13 shown in FIG. 15, is specified to be, for example, 0° with respect to the direction L1.

Figure 20A:
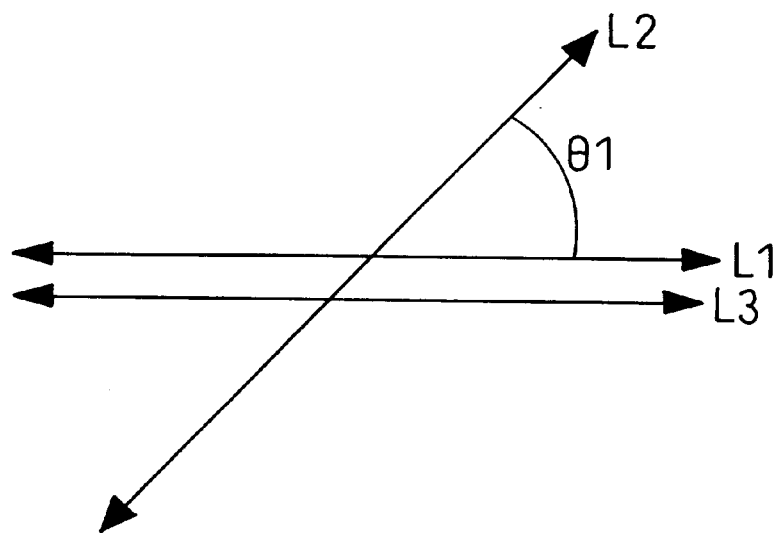
FIGS. 20(a) and 20(b) are drawings showing optical an arrangement of orientation of liquid crystal of the liquid crystal & polymer complex film of FIG. 15, the transparent axis of a polarizer plate, and a quarter-wavelength plate.
Figure 20B:
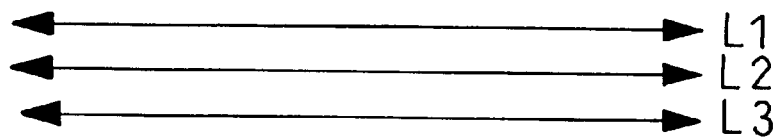

Since orientated polymer-dispersed liquid crystal of homeotropic orientation does not rotate the polarizer plate of incident light with no voltage applied, the liquid crystal 14 of the UV curable liquid crystal and the orientated polymer-dispersed liquid crystal layer 13 made of n-type liquid crystal have L1 and L2 directed as shown in FIG. 20(a). In this dark display also, the polymer-dispersed liquid crystal layer 13 is in a transparent state, therefore effecting good dark display.

Meanwhile, when voltage is applied, if the liquid crystal 14 is of p-type, since the liquid crystal molecules are orientated perpendicular to the transparent electrodes 10 and 7, birefringence effects do not occur with incident light entering at right angles. Therefore, the polarization state changes only due to the quarter-wavelength plate 5. Incident light from outside is reflected by the metal reflector film 7, passes through the quarter-wavelength plate 5 and the polarizer plate 4, and exits again. However, the light passes through the quarter-wavelength plate 5 twice during the time from entering the device to exiting again, thereby practically developing a phase difference equal to half the wavelength. Therefore, the plane of polarized light is rotated by 90°, and incident light is thereby absorbed by the polarizer plate 4 upon exiting, effecting so-called dark display. Moreover, when voltage is applied, if the liquid crystal 14 is of n-type, since the liquid crystal molecules are orientated parallel to the substrate, the difference between the refraction index of the liquid crystal and that of the polymer matrix causes diffusion. Here, chiral agent is added to the liquid crystal in advance to direct the polarization direction of the light entering the quarter-wavelength plate 5 to the L2 direction, and eliminates the change in polarization state caused by the quarter-wavelength plate 5, effecting bright display.

Furthermore, it is confirmed that the same effects can be produced with an opaque substrate such as a silicon substrate, instead of the glass substrate 2 of the present invention. When such a silicon substrate is used in place for the glass substrate 2 of the aforementioned embodiment, circuit elements such as the aforementioned scanning circuit 16, data circuit 17, control circuit 18 and voltage generating circuit may be integrated on the silicon substrate, which is an advantage. Besides, circuit integration in the same manner can be carried out by other methods such as a polysilicon layer formed on a quartz glass substrate and a polysilicon layer of a low temperature process formed on a glass substrate.

Besides, multi-color or full-color display can be performed by providing a color filter layer to one of the substrates.

Figure 24:
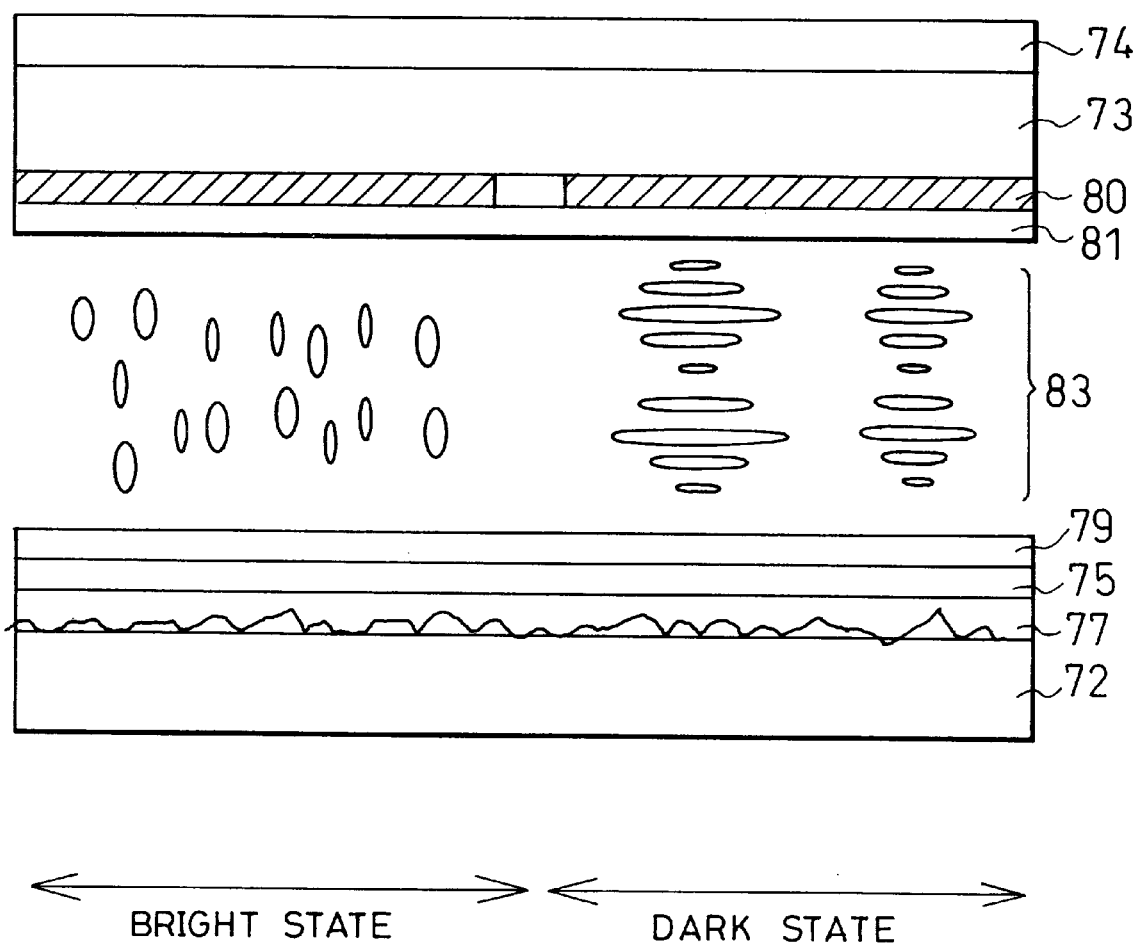
FIG. 24 is a cross-sectional view showing an arrangement example of a liquid crystal display device of a comparative example.
Figure 25:
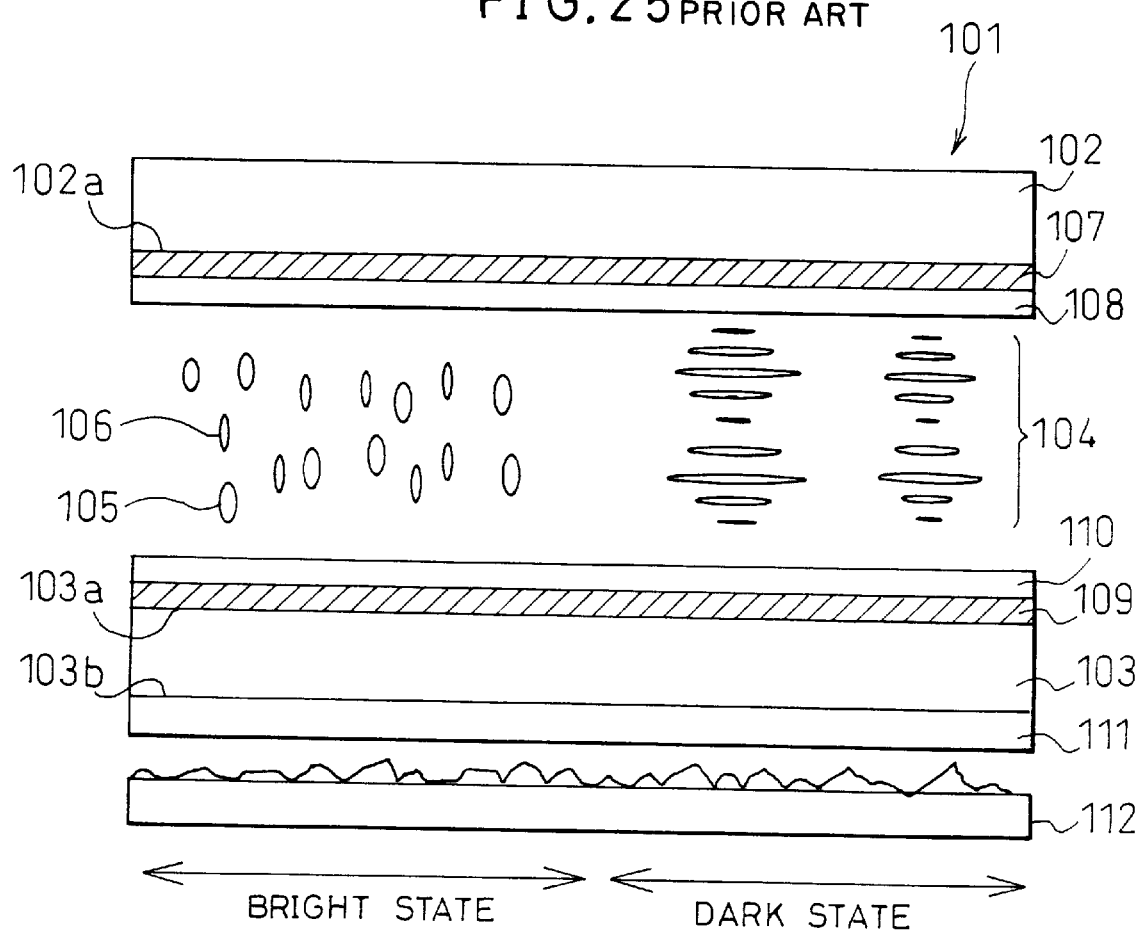
FIG. 25 is a cross-sectional view showing an arrangement of a conventional reflective type liquid crystal display device.
Figure 26B:
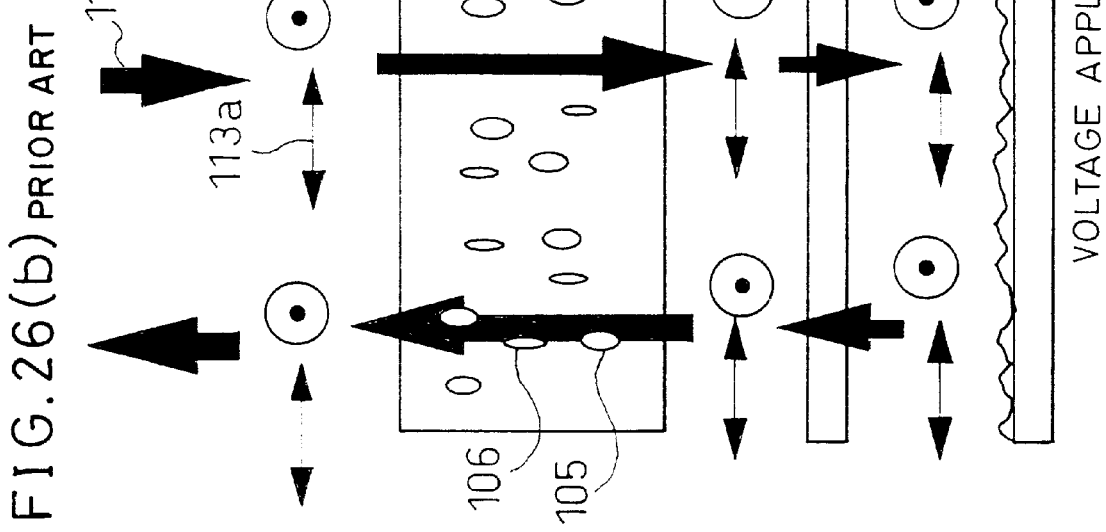
FIGS. 26(a) and 26(b) are explanatory drawings showing operation principles of the reflective type liquid crystal display device shown in FIG. 25.
Figure 26A:
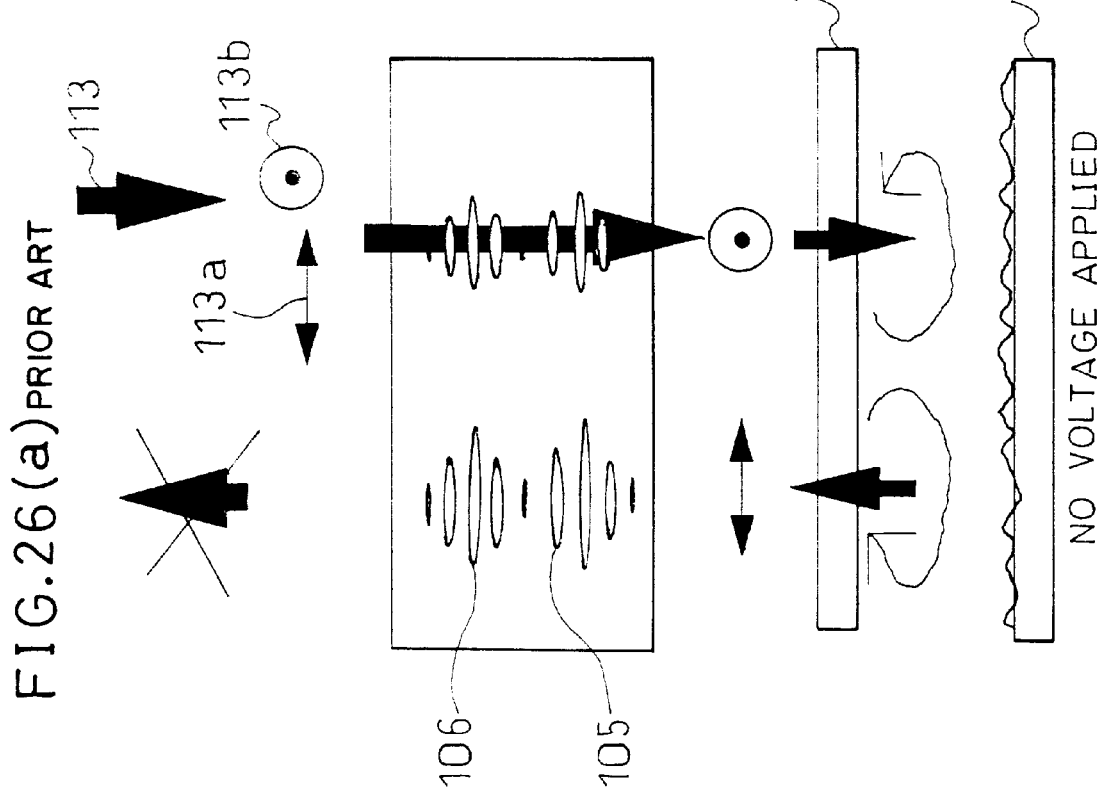

The following will explain an example of arrangement as shown in FIG. 24 for comparison. In this example, as in the embodiments, two substrates 72 and 73 flank a liquid crystal layer 83, a quarter-wavelength plate 75, a diffusion reflector film (concave-convex diffusing reflector electrode) 77. However, such voltage control for diffusion characteristics as mentioned in the embodiments cannot be performed. Therefore, the diffusion characteristics of bright display and those of dark display cannot be changed. If the diffusion effects by the diffusion reflector film are reinforced for bright display, dark display becomes brighter, and if the diffusion effects are weakened for dark display, bright display becomes darker.

In FIG. 24, the reference numeral 80 refers to a transparent electrode, the reference numeral 74 refers to a polarizer plate, and the reference numerals 81 and 79 refer to orientation films.

Another comparative example of arrangement is taken where the reflector film is mirror surface, and a diffusing film is attached on the entire surface of a liquid crystal display element. In such a case, since either the polarization properties of the liquid crystal are ideal, or the rear diffusion by a diffusing plate reflects part of incident light to the observer immediately, dark display becomes brighter, and in a case of dot matrix display, since displayed contents of neighboring pixels are diffused, fineness in display is degraded. If the diffusion effects are designed to be weaker so as to prevent those problems, bright display becomes darker in the same manner, and bright and dark display can only be possible with reflectance of the liquid crystal segment.

As laid out so far, in accordance with the present invention, incident light reaches the reflector member via the polarizer plate, the orientated polymer-dispersed type liquid crystal layer, and the quarter-wavelength plate, is reflected by the reflector member, and exits via the quarter-wavelength plate, the liquid crystal layer, and the polarizer plate. In other words, the present invention provides a light reflector film inside the liquid crystal display element, renders even the reflector surface of the light reflector member, causes no multiple reflection, and offers a reflector surface effecting good black display while preserving polarization.

In addition, even if one of the electrodes is a reflector electrode, the display device can prevent so-called reflections of images of the surroundings caused by the state of turbidity of the polymer-dispersed liquid crystal during bright display, is free from visibility difference, and in addition diffuses light in the direction of the observer, assuring enough brightness.

Furthermore, since no backlight is necessary, a sharp and high quality reflective type liquid crystal display device can be realized that is less power-consuming and provides better visibility in comparison with a liquid crystal display device equipped with a backlight.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A reflective type liquid crystal display device, having a liquid crystal display element provided with:

a quarter-wavelength plate; and a pair of substrates, each substrate being provided with a transparent electrode, the reflective type liquid crystal display device carrying out display by using ambient light, said element, comprising:

a reflector member, possessing an excellent polarization preservation property, for reflecting incident light; and a complex member, composed of a complex of liquid crystal and a polymer that are phase separated, for selectively diffusing incident light while transmitting the incident light, wherein the complex member is a liquid crystal layer disposed between the substrate and the reflector member, the liquid crystal being oriented with a twist angle in the range of 40° to 50°, and the quarter-wavelength plate is disposed between the reflector member and the liquid crystal layer, and a polarizer plate is provided on a side where the incident light enters.

2. The reflective type liquid crystal display device as defined in claim 1, wherein the polymer composing the liquid crystal layer is composed of a material exhibiting birefringence, and the liquid crystal layer exhibits a diffusion state when voltage is applied and does not exhibit a diffusion state when no voltage is applied.

3. The reflective type liquid crystal display device as defined in claim 1, wherein the reflector member has mirror finished surface.

4. The reflective type liquid crystal display device as defined in claim 1, wherein the reflector member is a diffusing mirror having smooth convexities and concavities.

5. The reflective type liquid crystal display device as defined in claim 1, wherein the quarter-wavelength plate is composed of a liquid crystalline polymer.

6. The reflective type liquid crystal display device as defined in claim 1, wherein the quarter-wavelength plate is composed of a polymer obtained from a low molecule having liquid crystallinity by stabilizing the orientation of the liquid crystal.

7. The reflective type liquid crystal display device as defined in claim 1, further comprising a color filter.

8. A reflective type liquid crystal display device, comprising a polarizer plate on a side of a liquid crystal element, through which side light enters the liquid crystal element, the liquid crystal element includes:
- an insulating substrate at least provided with a transparent electrode;
- a light reflector member provided with an opposite electrode for driving display in collaboration with the transparent electrode and a light reflector film formed on one of the surfaces of the insulating substrate;
- a polymer-dispersed liquid crystal layer that is a complex layer composed of an aligned liquid crystal phase and polymer resin phase provided between the insulating substrate and the light reflector member, twist angle of orientation of the liquid crystal being specified to be in the range of 40° to 50° between the insulating substrate and the reflector member, wherein the complex layer diffuses polarized light only in a specific direction without changing the plane of the polarized light while transmitting the polarized light; and
- a quarter-wavelength plate formed between the light reflector member and the polymer-dispersed liquid crystal layer.

9. The reflective type liquid crystal display device as defined in claim 8, wherein the polarizer plate has a transparent axis placed so as to coincide with either of directions of twisted orientation of the polymer-dispersed liquid crystal.

10. The reflective type liquid crystal display device as defined in claim 8, wherein the polymer-dispersed liquid crystal layer is composed of a polymer material exhibiting birefringence, and the polymer-dispersed liquid crystal layer exhibits a diffusion state when voltage is applied and does not exhibit a diffusion state when no voltage is applied.

11. The reflective type liquid crystal display device as defined in claim 8, wherein the light reflector film forming a light reflector surface of the light reflector member is disposed on a side of the light reflector member, the side facing the polymer-dispersed liquid crystal layer.

12. The reflective type liquid crystal display device as defined in claim 8, wherein the light reflector surface is either flat mirror finished surface or a diffusing mirror having smooth convexities and concavities.

13. The reflective type liquid crystal display device as defined in claim 8, wherein the quarter-wavelength plate is composed of either a liquid crystalline polymer or a polymer obtained from a low molecule having liquid crystallinity by stabilizing the orientation of the liquid crystal.

14. The reflective type liquid crystal display device as defined in claim 8, wherein the quarter-wavelength plate is disposed on the light reflector film of the light reflector member and is provided with a transparent electrode formed thereon, the transparent electrode being specified to oppose the transparent electrode formed on the insulating substrate.

15. The reflective type liquid crystal display device as defined in claim 8, wherein a color filter layer is provided either on the insulating substrate or on the transparent electrode on the insulating substrate.

16. The reflective type liquid crystal display device as defined in claim 8, wherein the quarter-wavelength plate is composed at least of a first layer and a second layer, the first layer has a retardation of 120 nm to 150 nm with respect to incident light entering at a right angle, the second layer is disposed so that the second layer and a reflector surface flank the first layer therebetween, the second layer has approximately double the retardation of the first layer, and the direction of a slow axis in a layer plane of the first layer is displaced from the direction of a slow axis in a layer plane of the second layer by 60° to 120°.

17. The reflective type liquid crystal display device as defined in claim 8, wherein the polymer-dispersed liquid crystal layer contains the liquid crystal in a rang of 50 weight % to 98 weight %.

* * * * *